(12) United States Patent
Inada

(10) Patent No.: US 7,764,398 B2
(45) Date of Patent: Jul. 27, 2010

(54) INFORMATION PROCESSING DEVICE, PROGRAM FOR OPERATING THE SAME, DOCUMENT SCANNING DEVICE, AND DOCUMENT SCANNING SYSTEM

(75) Inventor: Hajime Inada, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 728 days.

(21) Appl. No.: 11/529,300

(22) Filed: Sep. 29, 2006

(65) Prior Publication Data

US 2007/0165285 A1    Jul. 19, 2007

(30) Foreign Application Priority Data

Jan. 17, 2006    (JP) ............................. 2006-009320

(51) Int. Cl.
*H04N 1/00*    (2006.01)
*G06K 15/00*   (2006.01)

(52) U.S. Cl. ....................... 358/1.6; 358/1.15; 358/1.18

(58) Field of Classification Search ................ 358/488, 358/489, 1.15, 1.6, 1.1, 1.13, 1.18, 1.5, 1.9, 358/1.12, 505, 506, 407, 468, 474, 475, 486, 358/487, 491, 497, 493, 494, 496, 498; 355/23, 355/24; 382/312, 314, 315, 318; 347/2, 347/3, 5, 14, 23, 225; 399/1, 8, 9, 364, 370, 399/371, 374, 376, 408, 409, 410

See application file for complete search history.

(56) References Cited

U.S. PATENT DOCUMENTS 5,231,516 A *   7/1993  Kamon et al. ................ 358/449
5,461,459 A *  10/1995  Muramatsu et al. ........... 399/15
5,600,429 A     2/1997  Kutsuwada
6,101,283 A *   8/2000  Knox .......................... 382/254
2005/0100358 A1* 5/2005  Ushio et al. .................. 399/82
2005/0122544 A1  6/2005  Mizuhashi et al.

FOREIGN PATENT DOCUMENTS

| JP | 4-259163 A | 9/1992 |
| JP | 5-232760 A | 9/1993 |
| JP | 6-125434 | 5/1994 |
| JP | 2005-39761 | 2/2005 |

* cited by examiner

*Primary Examiner*—Dov Popovici
(74) *Attorney, Agent, or Firm*—McDermott Will & Emery LLP

(57) ABSTRACT

An information processing device includes: an image data receiving unit which receives image data of each page of a double-sided document generated by a document scanning device by double-side scanning of the document; a recognizable direction adjustment information receiving unit which receives recognizable direction adjustment information outputted by the document scanning device as information to be used for adjusting a recognizable direction of the image data of a back page of the document to a standard recognizable direction which is defined as the recognizable direction of the image data of a front page of the document; and a vertical inversion unit which vertically inverts the image data of the back page as needed based on the recognizable direction adjustment information so that the recognizable direction of the image data of the back page will be in the standard recognizable direction.

23 Claims, 17 Drawing Sheets

1ST FEED

2ND FEED

3RD FEED

FIG.5A  SCANNING METHOD #1

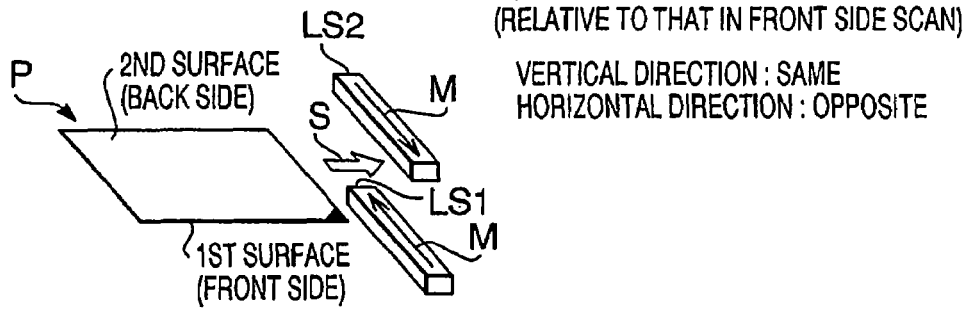

SCAN DIRECTION IN BACK SIDE SCAN
(RELATIVE TO THAT IN FRONT SIDE SCAN)

VERTICAL DIRECTION : SAME
HORIZONTAL DIRECTION : OPPOSITE

FIG.5B  SCANNING METHOD #2

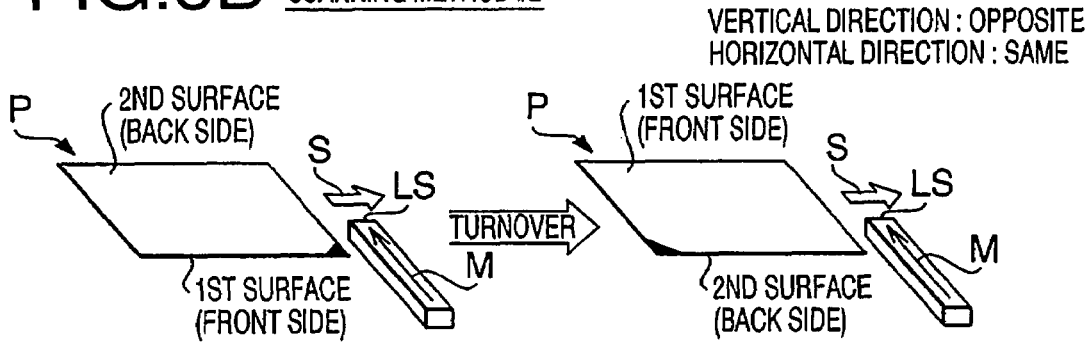

VERTICAL DIRECTION : OPPOSITE
HORIZONTAL DIRECTION : SAME

FIG.5C  SCANNING METHOD #3

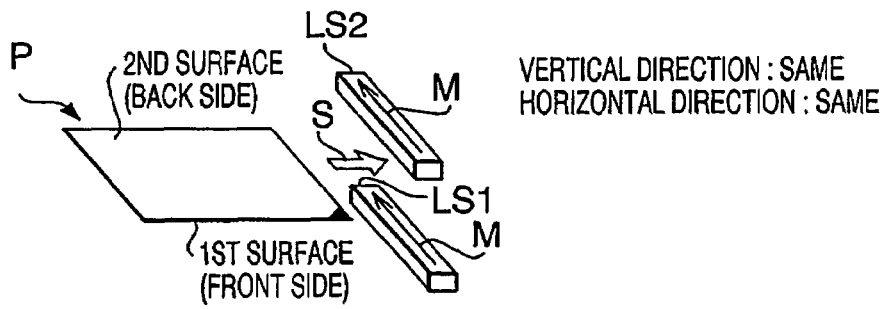

VERTICAL DIRECTION : SAME
HORIZONTAL DIRECTION : SAME

FIG.5D  SCANNING METHOD #4

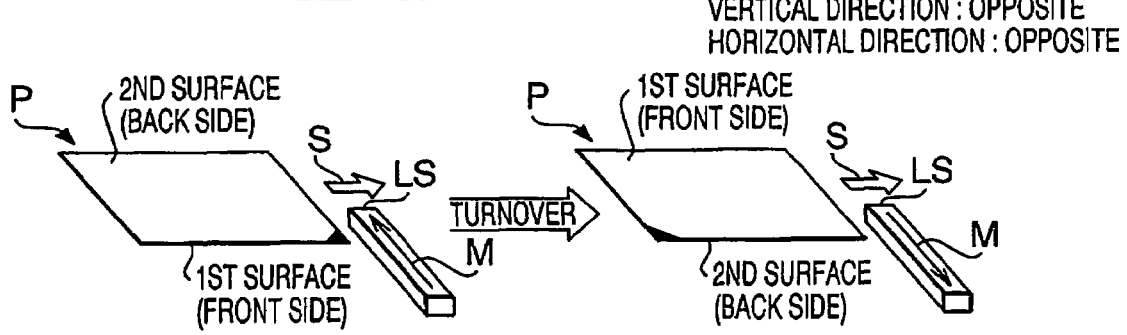

VERTICAL DIRECTION : OPPOSITE
HORIZONTAL DIRECTION : OPPOSITE

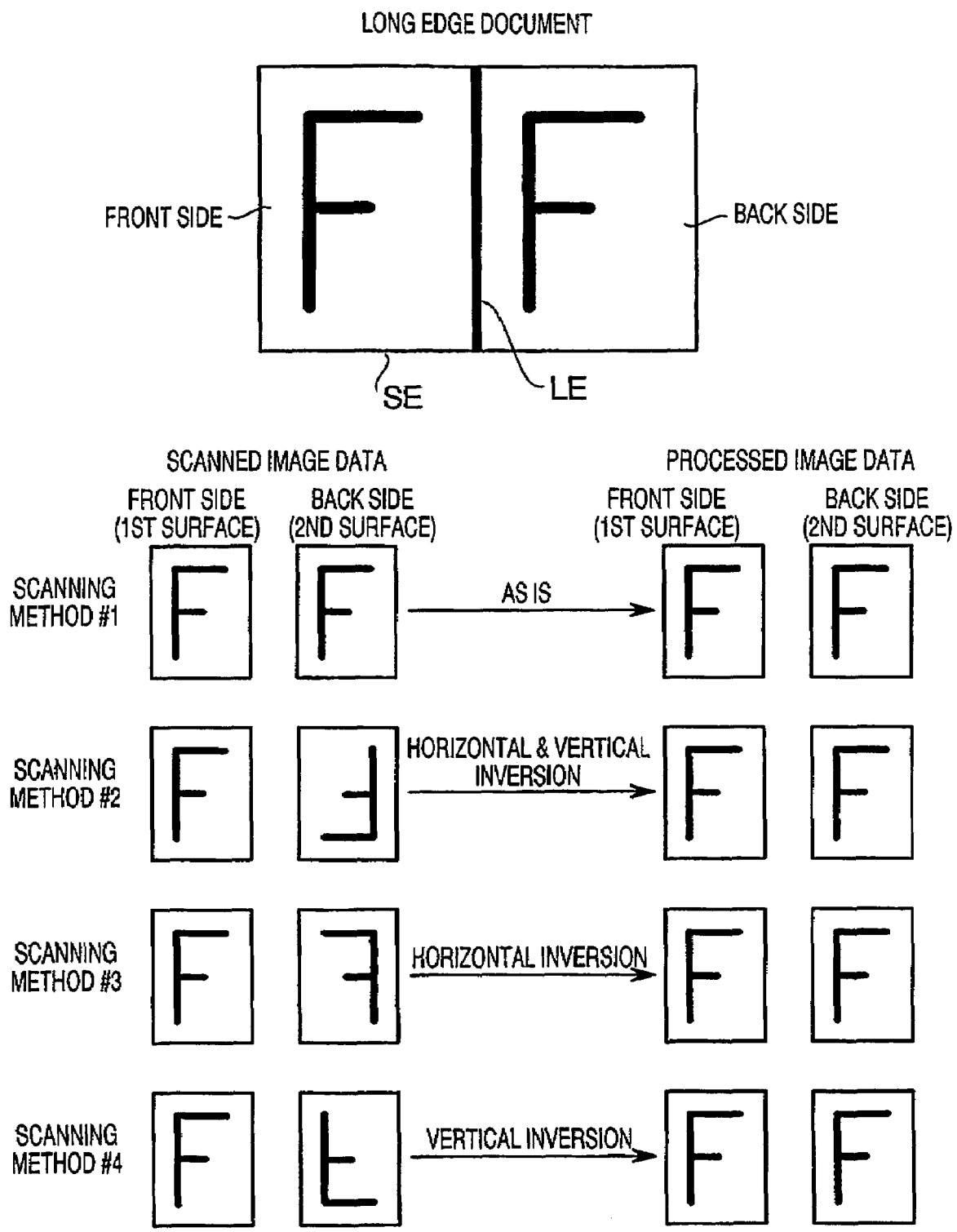

FIG. 7
SHORT EDGE DOCUMENT
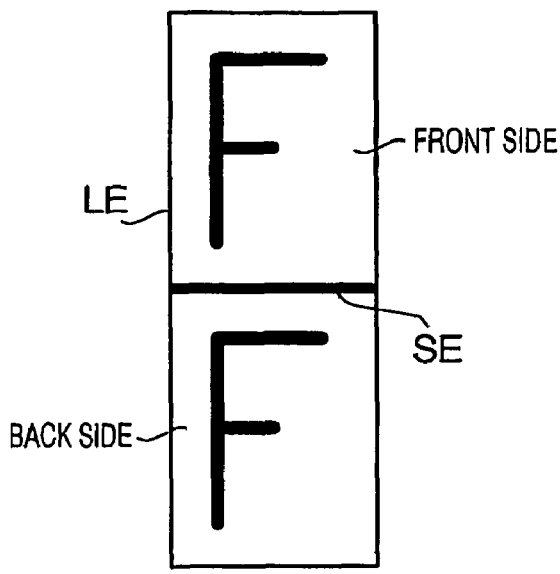
| | SCANNED IMAGE DATA | | | PROCESSED IMAGE DATA | |
|---|---|---|---|---|---|
| | FRONT SIDE (1ST SURFACE) | BACK SIDE (2ND SURFACE) | | FRONT SIDE (1ST SURFACE) | BACK SIDE (2ND SURFACE) |
| SCANNING METHOD #1 |  | 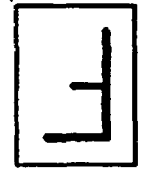 | HORIZONTAL & VERTICAL INVERSION → |  | 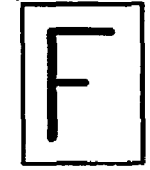 |
| SCANNING METHOD #2 | 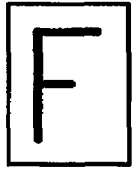 |  | AS IS → |  | 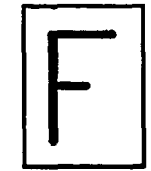 |
| SCANNING METHOD #3 | 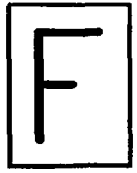 | 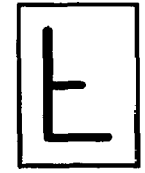 | VERTICAL INVERSION → |  |  |
| SCANNING METHOD #4 |  |  | HORIZONTAL INVERSION → |  | 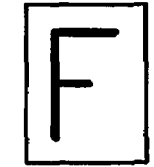 |

INFORMATION PROCESSING DEVICE, PROGRAM FOR OPERATING THE SAME, DOCUMENT SCANNING DEVICE, AND DOCUMENT SCANNING SYSTEM

CROSS-REFERENCE TO RELATED APPLICATION

This application claims priority under 35 U.S.C. §119 from Japanese Patent Application No. 2006-009320, filed on Jan. 17, 2006. The entire subject matters of the application are incorporated herein by reference.

BACKGROUND

1. Technical Field

The present invention relates to an information processing device, a program for operating the information processing device, a document scanning device and a document scanning system.

2. Related Art

Document scanning devices capable of scanning images on both sides of a double-sided document (double-side scanning) are in practical use in recent years. Such document scanning devices supporting the double-side scanning (double-sided document scanning devices) are employing different double-side scanning methods depending on their types. For example, a double-sided document scanning device of a certain type feeds a document to a scanning unit (placed in the middle of a document feeding path) with an ADF (Automatic Document Feeder), generates image data of the first surface of the document by scanning the first surface with the scanning unit, turns over the document, feeds the document again to the same scanning unit (used for the scanning of the first surface), and generates image data of the second surface of the document by scanning the second surface with the scanning unit. A double-sided document scanning device of another type feeds a document to a pair of scanning units (placed in the middle of a document feeding path) with an ADF and generates image data of the first and second surfaces of the document at once by simultaneously scanning the first and second surfaces with the pair of scanning units. Such double-sided document scanning devices have been disclosed in Japanese Patent Provisional Publication No.HEI05-232760 and Japanese Patent Provisional Publication No.HEI04-259163, for example.

In the double-sided document scanning devices like those described above, the image scanning direction of the scanning unit (main scanning direction) and the feeding direction of the document (sub scanning direction) can differ between the scanning of the first surface and the scanning of the second surface, by which the image data of the second surface (obtained by the scanning of the second surface) can be generated in a state horizontally and/or vertically inverted from the actual image on the second surface. Therefore, a scanner driver designed specifically for a document scanning device, installed in an information processing device such as a PC (Personal Computer), is generally provided with a function of correcting the direction of the image data of the second surface (compensating for the horizontal and/or vertical inversion of the scanned image data) by executing an inversion process to the image data.

Whether the scanned image data involves the horizontal and/or vertical inversion or not varies depending on the double-side scanning method of the document scanning device. Therefore, a scanner driver designed specifically for the document scanning device, in which information about the inversion has previously been incorporated, is capable of executing a proper inversion process to the image data of the second surface.

However, when a user of a PC (information processing device) hopes to use a new document scanning device (of a type different from that of a document scanning device currently used with the PC), the user has to take the trouble of installing a new scanner driver designed specifically for the new document scanning device.

It is of course possible to configure a document scanning device to execute a proper inversion process to the scanned image data of the second surface for itself and transmit the inverted image data to the information processing device. However, installing such a function in a document scanning device is extremely disadvantageous from the viewpoint of costs since the inversion of image data requires a considerable memory capacity and a high-speed processor and the data size of image data is increasing year after year.

SUMMARY

Aspects of the present invention are advantageous in that an information processing device, a program for operating the information processing device, a document scanning device and a document scanning system, capable of realizing a proper inversion process to scanned image data irrespective of the type (double-side scanning method) of the document scanning device and without causing an extreme increase in costs, can be provided.

BRIEF DESCRIPTION OF THE ACCOMPANYING DRAWINGS

FIGS. 5A-5D are schematic diagrams showing four methods of double-side scanning.

FIG. 6 is a schematic diagram showing image data (scanned image data) generated by double-side scanning of a long edge document according to scanning methods #1-#4 shown in FIGS. 5A-5D and image data (processed image data) obtained by executing an inversion process to the scanned image data.

FIG. 7 is a schematic diagram showing image data (scanned image data) generated by double-side scanning of a short edge document according to the scanning methods #1-#4 and image data (processed image data) obtained by executing an inversion process to the scanned image data.

DETAILED DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

In accordance with an aspect of the present invention, there is provided an information processing device comprising: an image data receiving unit which receives image data of each page of a double-sided document generated by a document scanning device by double-side scanning of the document; a recognizable direction adjustment information receiving unit which receives recognizable direction adjustment information outputted by the document scanning device as information to be used for adjusting a recognizable direction of the image data of a back page of the document to a standard recognizable direction which is defined as the recognizable direction of the image data of a front page of the document; and a vertical inversion unit which vertically inverts the image data of the back page as needed based on the recognizable direction adjustment information so that the recognizable direction of the image data of the back page will be in the standard recognizable direction.

With the above information processing device, even when the image data of the back page (i.e. back side) of the double-sided document is generated and outputted by the document scanning device in a state vertically inverted from the image data of the front page (i.e. front side), that is, even when the recognizable direction of the image data of the back page is opposite to that of the image data of the front page, the image data of the back page can be adjusted to be in the same recognizable direction as the image data of the front page by vertically inverting the image data of the back page based on the recognizable direction adjustment information (information to be used for adjusting the recognizable direction of the image data of the back page to the standard recognizable direction).

Figure 16A:
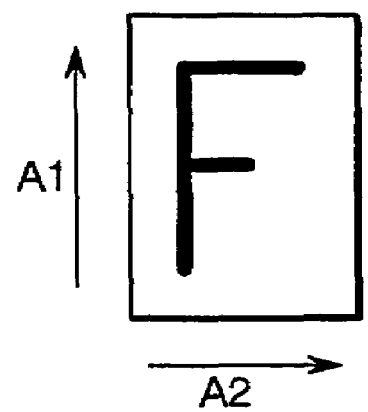
FIGS. 16A-16D are schematic diagrams for explaining a recognizable direction and a reading direction.

Two directions (recognizable direction, reading direction) used in the present invention will be explained here referring to FIGS. 16A-16D. FIG. 16A shows a document on which a character or figure has been printed or drawn (hereinafter simply expressed as "printed") so that the character/figure is recognized by a human as in the normal direction. The aforementioned "recognizable direction" of (each page of) the document (direction of recognition of each character/figure) is the direction indicated by the arrow A1 heading from the bottom to the top of the character/figure. Meanwhile a "reading direction" of (each page of) the document (direction of progress of reading characters) is the direction indicated by the arrow A2 heading from the left to the right of the character/figure. The recognizable direction and the reading direction are orthogonal to each other.

Figure 16B:
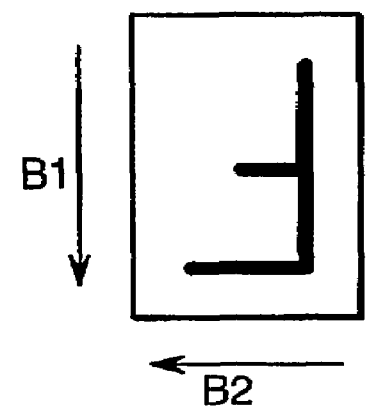

FIG. 16B shows a document on which a character or figure has been printed in a state 180 degrees rotated from the above state in which the character/figure is recognized by a human as in the normal direction. The recognizable direction of the document of FIG. 16B is the direction indicated by the arrow B1 and the reading direction of the document is the direction indicated by the arrow B2. The recognizable direction of the document of FIG. 16B is opposite to that of the document of FIG. 16A. The reading direction of the document of FIG. 16B is also opposite to that of the document of FIG. 16A.

Figure 16C:
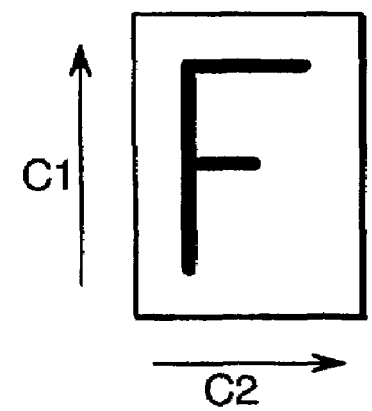

FIG. 16C shows an image formed by a computer or a printer on a display or a print medium directly (without changing the direction) from image data of the document of FIG. 16A that has been generated by a document scanning device by scanning the document. The recognizable direction of the image of FIG. 16C is the direction indicated by the arrow C1 and the reading direction of the image is the direction indicated by the arrow C2. The recognizable direction of the image data (used for generating the image of FIG. 16C) is the same as that of the document of FIG. 16A. The reading direction of the image data (used for generating the image of FIG. 16C) is the same as that of the document of FIG. 16A.

Figure 16D:
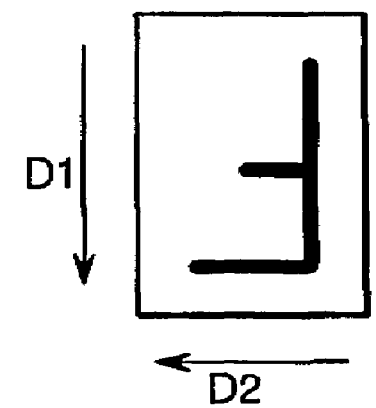

FIG. 16D shows an image formed by a computer or a printer on a display or a print medium directly (without changing the direction) from image data of the document of FIG. 16A that has been generated by a document scanning device (capable of double-side scanning, see FIGS. 2 and FIGS. 3A-3C) as image data of the back page by turning over the document and scanning the character/figure on the back page of the document. The recognizable direction of the image of FIG. 16D is the direction indicated by the arrow D1 and the reading direction of the image is the direction indicated by the arrow D2. Therefore, when the double-side scanning of a double-sided document is executed by the document scanning device shown in FIGS. 2 and FIGS. 3A-3C, image data of the front page of the document (generated by scanning the front page) and image data of the back page of the document (generated-by scanning the back page) have opposite recognizable directions and opposite reading directions.

In at least one aspect, the recognizable direction adjustment information receiving unit receives recognizable direction information, which takes on different values depending on whether the recognizable direction of the image data of each page is the same as or opposite to the recognizable direction of the document, as the recognizable direction adjustment information. The information processing device further comprises a first recognizable direction judgment unit which judges whether or not the recognizable direction of the image data of each page is opposite to the recognizable direction of the document based on the recognizable direction information. The vertical inversion unit vertically inverts the image data of a page when the recognizable direction of the image data of the page is judged to be opposite to the recognizable direction of the document by the first recognizable direction judgment unit.

With the above configuration, by vertically inverting the image data of a page when the recognizable direction of the image data of the page is judged to be opposite to that of the document based on the recognizable direction information (which takes on different values depending on whether the recognizable direction of the image data of each page is the same as or opposite to that of the document), the image data of the front and back pages can be adjusted to be in the same recognizable direction (standard recognizable direction) irrespective of the double-side scanning method of the document scanning device when the recognizable directions of the front and back pages are opposite to each other.

In at least one aspect, the information processing device further comprises a document binding information receiving unit which receives document binding information indicating whether the double-sided document is a long edge-bound document or a short edge-bound document. The first recognizable direction judgment unit makes the judgment on whether or not the recognizable direction of the image data of each page is opposite to the recognizable direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the first recognizable direction judgment unit make the judgment based also on the document binding information indicating whether the double-sided document is a long edge-bound document or a short edge-bound document.

Figure 17A:
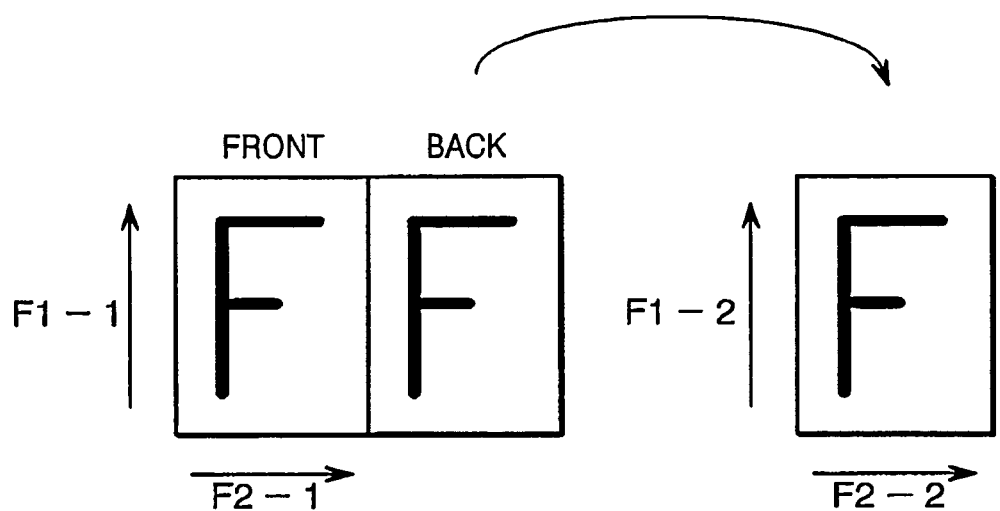
FIGS. 17A and 17B are schematic diagrams for explaining a long edge document (long edge-bound document) and a short edge document (short edge-bound document).
Figure 17B:
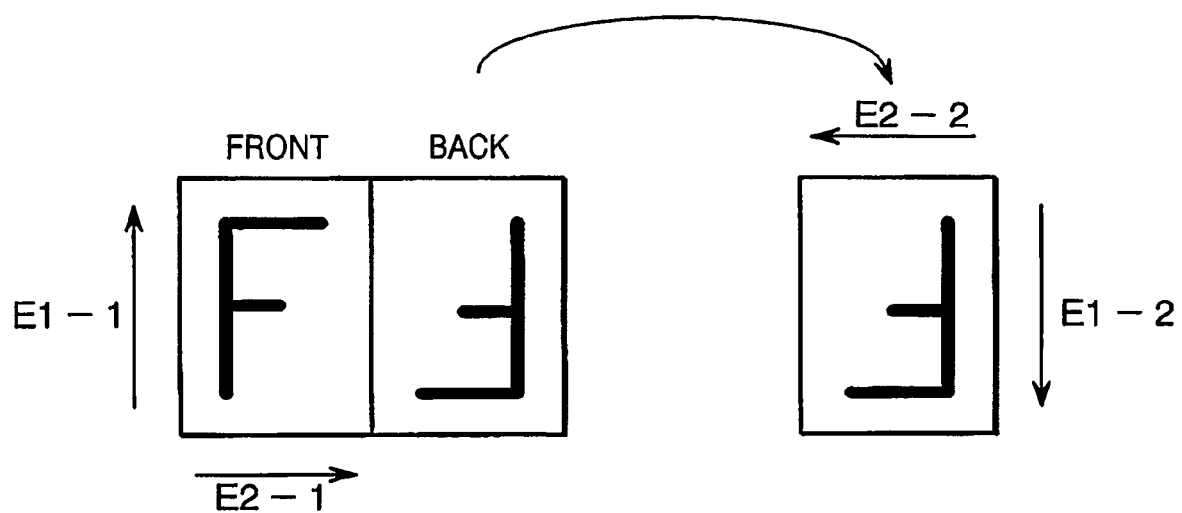

The "long edge-bound document" and "short edge-bound document" will be explained here referring to FIGS. 17A and 17B. FIG. 17A shows a long edge-bound document (long edge document). A long edge-bound document is a document (e.g. a sheet of paper) to be bound to other documents along its long edge, that is, a document to be opened around its long edge. In a double-sided document of the long edge-bound type, when the document in the normal position (with each character or figure on the front page being recognized by a human as in the normal direction) is rotated by 180 degrees around a long edge of the document, each character or figure on the back page of the document is recognized by the human as in the normal direction. Meanwhile, FIG. 17B shows a short edge-bound document (short edge document). A short edge-bound document is a document (e.g. a sheet of paper) to be bound to other documents along its short edge, that is, a document to be opened around its short edge. In a double-sided document of the short edge-bound type, when the document in the normal position (with each character or figure on the front page being recognized by a human as in the normal direction) is rotated by 180 degrees around a short edge of the document, each character or figure on the back page of the document is recognized by the human as in the normal direction.

In at least one aspect, the recognizable direction adjustment information receiving unit receives scanning method information, which represents a double-side scanning method of the document scanning device and takes on different values depending on the scanning method, as the recognizable direction adjustment information. The information processing device further comprises a second recognizable direction judgment unit which judges whether or not the recognizable direction of the image data of each page is opposite to the recognizable direction of the document based on the scanning method information. The vertical inversion unit vertically inverts the image data of a page when the recognizable direction of the image data of the page is judged to be opposite to the recognizable direction of the document by the second recognizable direction judgment unit.

With the above configuration, by vertically inverting the image data of a page when the recognizable direction of the image data of the page is judged to be opposite to that of the document based on the scanning method information (which represents the double-side scanning method of the document scanning device and takes on different values depending on the scanning method), the image data of the front and back pages can be adjusted to be in the same recognizable direction (standard recognizable direction) appropriately for the double-side scanning method of the document scanning device when the recognizable directions of the front and back pages are opposite to each other.

In at least one aspect, the information processing device further comprises a first storage unit which stores information indicating whether or not the recognizable direction of the image data of the back page is opposite to the recognizable direction of the document while associating the information with possible pieces of scanning method information. The second recognizable direction judgment unit judges that the recognizable direction of the image data of the back page is opposite to the recognizable direction of the document when the information stored in the first storage unit being associated with the scanning method information received from the document scanning device indicates the fact.

With the above configuration, by vertically inverting the image data of the back page based on the information (indicating whether or not the recognizable direction of the image data of the back page is opposite to that of the document) stored in the first storage unit being associated with the scanning method information received from the document scanning device, the image data of the back page can be adjusted to be in the same recognizable direction as the front page (standard recognizable direction) appropriately for the double-side scanning method of the document scanning device when the recognizable directions of the front and back pages are opposite to each other.

In at least one aspect, the information processing device further comprises a document binding information receiving unit which receives document binding information indicating whether the double-sided document is a long edge-bound document or a short edge-bound document. The second recognizable direction judgment unit makes the judgment on whether or not the recognizable direction of the image data of each page is opposite to the recognizable direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the second recognizable direction judgment unit make the judgment based also on the document binding information indicating whether the double-sided document is a long edge-bound document or a short edge-bound document.

In at least one aspect, the recognizable direction adjustment information receiving unit receives type information, which represents the type of the document scanning device and takes on different values depending on the type, as the recognizable direction adjustment information. The information processing device further comprises a third recognizable direction judgment unit which judges whether or not the recognizable direction of the image data of each page is opposite to the recognizable direction of the document based on the type information. The vertical inversion unit vertically inverts the image data of a page when the recognizable direction of the image data of the page is judged to be opposite to the recognizable direction of the document by the third recognizable direction judgment unit.

With the above configuration, by vertically inverting the image data of a page when the recognizable direction of the image data of the page is judged to be opposite to that of the document based on the type information (which represents the type of the document scanning device and takes on different values depending on the type), the image data of the front and back pages can be adjusted to be in the same recognizable direction (standard recognizable direction) appropriately for the type of the document scanning device when the recognizable directions of the front and back pages are opposite to each other.

In at least one aspect, the information processing device further comprises a second storage unit which stores information indicating whether or not the recognizable direction of the image data of the back page is opposite to the recognizable direction of the document while associating the information with possible pieces of type information. The third recognizable direction judgment unit judges that the recognizable direction of the image data of the back page is opposite to the recognizable direction of the document when the information stored in the second storage unit being associated with the type information received from the document scanning device indicates the fact.

With the above configuration, by vertically inverting the image data of the back page based on the information (indicating whether or not the recognizable direction of the image data of the back page is opposite to that of the document) stored in the second storage unit being associated with the type information received from the document scanning device, the image data of the back page can be adjusted to be in the same recognizable direction as the front page (standard recognizable direction) appropriately for the type of the document scanning device when the recognizable directions of the front and back pages are opposite to each other.

In at least one aspect, the information processing device further comprises a document binding information receiving unit which receives document binding information indicating whether the double-sided document is a long edge-bound document or a short edge-bound document. The third recognizable direction judgment unit makes the judgment on whether or not the recognizable direction of the image data of each page is opposite to the recognizable direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the third recognizable direction judgment unit make the judgment based also on the document binding information indicating whether the double-sided document is a long edge-bound document or a short edge-bound document.

In at least one aspect, the information processing device further comprises: a reading direction adjustment information receiving unit which receives reading direction adjustment information outputted by the document scanning device as information to be used for adjusting a reading direction of the image data of the back page, in a state in which the recognizable direction of the image data of the back page has been adjusted to the standard recognizable direction, to a standard reading direction which is defined as the reading direction of the image data of the front page; and a horizontal inversion unit which horizontally inverts the image data of the back page as needed based on the reading direction adjustment information so that the reading direction of the image data of the back page will be in the standard reading direction.

With the above configuration, even when the image data of the back page of the double-sided document is generated and outputted by the document scanning device in a state horizontally inverted from the image data of the front page, that is, even when the reading direction of the image data of the back page is opposite to that of the image data of the front page, the image data of the back page can be adjusted to be in the same reading direction as the image data of the front page by horizontally inverting the image data of the back page based on the reading direction adjustment information (information to be used for adjusting the reading direction of the image data of the back page to the standard reading direction).

In at least one aspect, the reading direction adjustment information receiving unit receives reading direction information, which takes on different values depending on whether the reading direction of the image data of each page is the same as or opposite to the reading direction of the document, as the reading direction adjustment information. The information processing device further comprises a first reading direction judgment unit which judges whether or not the reading direction of the image data of each page is opposite to the reading direction of the document based on the reading direction information. The horizontal inversion unit horizontally inverts the image data of a page when the reading direction of the image data of the page is judged to be opposite to the reading direction of the document by the first reading direction judgment unit.

With the above configuration, by horizontally inverting the image data of a page when the reading direction of the image data of the page is judged to be opposite to that of the document based on the reading direction information (which takes on different values depending on whether the reading direction of the image data of each page is the same as or opposite to that of the document), the image data of the front and back pages can be adjusted to be in the same reading direction (standard reading direction) irrespective of the double-side scanning method of the document scanning device when the reading directions of the front and back pages are opposite to each other.

In at least one aspect, the information processing device further comprises a document binding information receiving unit which receives document binding information indicating whether the double-sided document is a long edge-bound document or a short edge-bound document. The first reading direction judgment unit makes the judgment on whether or not the reading direction of the image data of each page is opposite to the reading direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the first reading direction judgment unit make the judgment based also on the document binding information indicating whether the double-sided document is a long edge-bound document or a short edge-bound document.

In at least one aspect, the reading direction adjustment information receiving unit receives scanning method information, which represents a double-side scanning method of the document scanning device and takes on different values depending on the scanning method, as the reading direction adjustment information. The information processing device further comprises a second reading direction judgment unit which judges whether or not the reading direction of the image data of each page is opposite to the reading direction of the document based on the scanning method information. The horizontal inversion unit horizontally inverts the image data of a page when the reading direction of the image data of the page is judged to be opposite to the reading direction of the document by the second reading direction judgment unit.

With the above configuration, by horizontally inverting the image data of a page when the reading direction of the image data of the page is judged to be opposite to that of the document based on the scanning method information (which represents the double-side scanning method of the document scanning device and takes on different values depending on the scanning method), the image data of the front and back pages can be adjusted to be in the same reading direction (standard reading direction) appropriately for the double-side scanning method of the document scanning device when the reading directions of the front and back pages are opposite to each other.

In at least one aspect, the information processing device further comprises a third storage unit which stores information indicating whether or not the reading direction of the image data of the back page is opposite to the reading direction of the document while associating the information with possible pieces of scanning method information. The second reading direction judgment unit judges that the reading direction of the image data of the back page is opposite to the reading direction of the document when the information stored in the third storage unit being associated with the scanning method information received from the document scanning device indicates the fact.

With the above configuration, by horizontally inverting the image data of the back page based on the information (indicating whether or not the reading direction of the image data of the back page is opposite to that of the document) stored in the third storage unit being associated with the scanning method information received from the document scanning device, the image data of the back page can be adjusted to be in the same reading direction as the front page (standard reading direction) appropriately for the double-side scanning method of the document scanning device when the reading directions of the front and back pages are opposite to each other.

In at least one aspect, the information processing device further comprises a document binding information receiving unit which receives document binding information indicating whether the double-sided document is a long edge-bound document or a short edge-bound document. The second reading direction judgment unit makes the judgment on whether or not the reading direction of the image data of each page is opposite to the reading direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the second reading direction judgment unit make the judgment based also on the document binding information indicating whether the double-sided document is a long edge-bound document or a short edge-bound document.

In at least one aspect, the reading direction adjustment information receiving unit receives type information, which represents the type of the document scanning device and takes on different values depending on the type, as the reading direction adjustment information. The information processing device further comprises a third reading direction judgment unit which judges whether or not the reading direction of the image data of each page is opposite to the reading direction of the document based on the type information. The horizontal inversion unit horizontally inverts the image data of a page when the reading direction of the image data of the page is judged to be opposite to the reading direction of the document by the third reading direction judgment unit.

With the above configuration, by horizontally inverting the image data of a page when the reading direction of the image data of the page is judged to be opposite to that of the document based on the type information (which represents the type of the document scanning device and takes on different values depending on the type), the image data of the front and back pages can be adjusted to be in the same reading direction (standard reading direction) appropriately for the type of the document scanning device when the reading directions of the front and back pages are opposite to each other.

In at least one aspect, the information processing device further comprises a fourth storage unit which stores information indicating whether or not the reading direction of the image data of the back page is opposite to the reading direction of the document while associating the information with possible pieces of type information. The third reading direction judgment unit judges that the reading direction of the image data of the back page is opposite to the reading direction of the document when the information stored in the fourth storage unit being associated with the type information received from the document scanning device indicates the fact.

With the above configuration, by horizontally inverting the image data of the back page based on the information (indicating whether or not the reading direction of the image data of the back page is opposite to that of the document) stored in the fourth storage unit being associated with the type information received from the document scanning device, the image data of the back page can be adjusted to be in the same reading direction as the front page (standard reading direction) appropriately for the type of the document scanning device when the reading directions of the front and back pages are opposite to each other.

In at least one aspect, the information processing device further comprises a document binding information receiving unit which receives document binding information indicating whether the double-sided document is a long edge-bound document or a short edge-bound document. The third reading direction judgment unit makes the judgment on whether or not the reading direction of the image data of each page is opposite to the reading direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the third reading direction judgment unit make the judgment based also on the document binding information indicating whether the double-sided document is a long edge-bound document or a short edge-bound document.

In accordance with another aspect of the present invention, there is provided a computer program product comprising computer-readable instructions that cause a computer to function as: an image data receiving unit which receives image data of each page of a double-sided document generated by a document scanning device by double-side scanning of the document; a recognizable direction adjustment information receiving unit which receives recognizable direction adjustment information outputted by the document scanning device as information to be used for adjusting a recognizable direction of the image data of a back page of the document to a standard recognizable direction which is defined as the recognizable direction of the image data of a front page of the document; and a vertical inversion unit which vertically inverts the image data of the back page as needed based on the recognizable direction adjustment information so that the recognizable direction of the image data of the back page will be in the standard recognizable direction.

With the above computer program product, even when the image data of the back page of the double-sided document is generated and outputted by the document scanning device in a state vertically inverted from the image data of the front page, that is, even when the recognizable direction of the image data of the back page is opposite to that of the image data of the front page, the image data of the back page can be adjusted to be in the same recognizable direction as the image data of the front page by vertically inverting the image data of the back page based on the recognizable direction adjustment information (information to be used for adjusting the recognizable direction of the image data of the back page to the standard recognizable direction).

In accordance with another aspect of the present invention, there is provided a document scanning device comprising: a scanning unit which scans each page of a double-sided document and thereby generates image data of each page; an image data outputting unit which outputs the image data of each page generated by the scanning unit; and a recognizable direction adjustment information outputting unit which outputs recognizable direction adjustment information as information to be used for adjusting a recognizable direction of the image data of a back page of the document to a standard recognizable direction which is defined as the recognizable direction of the image data of a front page of the document.

With the above document scanning device, even when the recognizable direction of the image data of the back page outputted by the document scanning device is opposite to that of the image data of the front page, an information processing device (receiving the image data and the recognizable direction adjustment information outputted by the document scanning device) is allowed to adjust the image data of the back page to be in the same recognizable direction as the image data of the front page (standard recognizable direction) based on the recognizable direction adjustment information.

In at least one aspect, the recognizable direction adjustment information outputting unit outputs recognizable direction information, which takes on different values depending on whether the recognizable direction of the image data of each page is the same as or opposite to the recognizable direction of the document, as the recognizable direction adjustment information.

With the above configuration, by outputting the recognizable direction information, the information processing device receiving the recognizable direction information is allowed to adjust the image data of the front and back pages to be in the same recognizable direction (standard recognizable direction) irrespective of the double-side scanning method of the document scanning device when the recognizable directions of the front and back pages are opposite to each other.

In at least one aspect, the recognizable direction adjustment information outputting unit outputs scanning method information, which represents a double-side scanning method of the document scanning device and takes on different values depending on the scanning method, as the recognizable direction adjustment information.

With the above configuration, by outputting the scanning method information, the information processing device receiving the scanning method information is allowed to adjust the image data of the front and back pages to be in the same recognizable direction (standard recognizable direction) appropriately for the double-side scanning method of the document scanning device when the recognizable directions of the front and back pages are opposite to each other.

In at least one aspect, the recognizable direction adjustment information outputting unit outputs type information, which represents the type of the document scanning device and takes on different values depending on the type, as the recognizable direction adjustment information.

With the above configuration, by outputting the type information, the information processing device receiving the type information is allowed to adjust the image data of the front and back pages to be in the same recognizable direction (standard recognizable direction) appropriately for the type of the document scanning device when the recognizable directions of the front and back pages are opposite to each other.

In at least one aspect, the document scanning device further comprises a reading direction adjustment information outputting unit which outputs reading direction adjustment information as information to be used for adjusting a reading direction of the image data of the back page, in a state in which the recognizable direction of the image data of the back page has been adjusted to the standard recognizable direction, to a standard reading direction which is defined as the reading direction of the image data of the front page.

With the above configuration, even when the reading direction of the image data of the back page outputted by the document scanning device is opposite to that of the image data of the front page, the information processing device (receiving the image data and the reading direction adjustment information outputted by the document scanning device) is allowed to adjust the image data of the back page to be in the same reading direction as the image data of the front page (standard reading direction) based on the reading direction adjustment information.

In at least one aspect, the reading direction adjustment information outputting unit outputs reading direction information, which takes on different values depending on whether the reading direction of the image data of each page is the same as or opposite to the reading direction of the document, as the reading direction adjustment information.

With the above configuration, by outputting the reading direction information, the information processing device receiving the reading direction information is allowed to adjust the image data of the front and back pages to be in the same reading direction (standard reading direction) irrespective of the double-side scanning method of the document scanning device when the reading directions of the front and back pages are opposite to each other.

In at least one aspect, the reading direction adjustment information outputting unit outputs scanning method information, which represents a double-side scanning method of the document scanning device and takes on different values depending on the scanning method, as the reading direction adjustment information.

With the above configuration, by outputting the scanning method information, the information processing device receiving the scanning method information is allowed to adjust the image data of the front and back pages to be in the same reading direction (standard reading direction) appropriately for the double-side scanning method of the document scanning device when the reading directions of the front and back pages are opposite to each other.

In at least one aspect, the reading direction adjustment information outputting unit outputs type information, which represents the type of the document scanning device and takes on different values depending on the type, as the reading direction adjustment information.

With the above configuration, by outputting the type information, the information processing device receiving the type information is allowed to adjust the image data of the front and back pages to be in the same reading direction (standard reading direction) appropriately for the type of the document scanning device when the reading directions of the front and back pages are opposite to each other.

In accordance with another aspect of the present invention, there is provided a document scanning system comprising a document scanning device and an information processing device. The document scanning device includes: a scanning unit which scans each page of a double-sided document and thereby generates image data of each page; an image data outputting unit which outputs the image data of each page generated by the scanning unit; and a recognizable direction adjustment information outputting unit which outputs recognizable direction adjustment information as information to be used for adjusting a recognizable direction of the image data of a back page of the document to a standard recognizable direction which is defined as the recognizable direction of the image data of a front page of the document. The information processing device includes: an image data receiving unit which receives the image data of each page of the document generated by the document scanning device; a recognizable direction adjustment information receiving unit which receives the recognizable direction adjustment information outputted by the document scanning device; and a vertical inversion unit which vertically inverts the image data of the back page as needed based on the recognizable direction adjustment information so that the recognizable direction of the image data of the back page will be in the standard recognizable direction.

With the above document scanning system, even when the recognizable direction of the image data of the back page outputted by the document scanning device is opposite to that of the image data of the front page, the image data of the back page can be adjusted to be in the same recognizable direction as the image data of the front page (standard recognizable direction) by the information processing device (receiving the image data and the recognizable direction adjustment information outputted by the document scanning device) by vertically inverting the image data of the back page based on the recognizable direction adjustment information.

In at least one aspect, the recognizable direction adjustment information outputting unit of the document scanning device outputs recognizable direction information, which takes on different values depending on whether the recognizable direction of the image data of each page is the same as or opposite to the recognizable direction of the document, as the recognizable direction adjustment information. The recognizable direction adjustment information receiving unit of the information processing device receives the recognizable direction information as the recognizable direction adjustment information. The information processing device further includes a first recognizable direction judgment unit which judges whether or not the recognizable direction of the image data of each page is opposite to the recognizable direction of the document based on the recognizable direction information. The vertical inversion unit of the information processing device vertically inverts the image data of a page when the recognizable direction of the image data of the page is judged to be opposite to the recognizable direction of the document by the first recognizable direction judgment unit.

With the above configuration, by letting the document scanning device output the recognizable direction information and letting the information processing device vertically invert the image data of a page when the recognizable direction of the image data of the page is judged to be opposite to that of the document based on the recognizable direction information, the image data of the front and back pages can be adjusted to be in the same recognizable direction (standard recognizable direction) irrespective of the double-side scanning method of the document scanning device when the recognizable directions of the front and back pages are opposite to each other.

In at least one aspect, the information processing device further includes a document binding information receiving unit which receives document binding information indicating whether the double-sided document is a long edge-bound document or a short edge-bound document. The first recognizable direction judgment unit of the information processing device makes the judgment on whether or not the recognizable direction of the image data of each page is opposite to the recognizable direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the first recognizable direction judgment unit make the judgment based also on the document binding information indicating whether the double-sided document is a long edge-bound document or a short edge-bound document.

In at least one aspect, the recognizable direction adjustment information outputting unit of the document scanning device outputs scanning method information, which represents a double-side scanning method of the document scanning device and takes on different values depending on the scanning method, as the recognizable direction adjustment information. The recognizable direction adjustment information receiving unit of the information processing device receives the scanning method information as the recognizable direction adjustment information. The information processing device further includes a second recognizable direction judgment unit which judges whether or not the recognizable direction of the image data of each page is opposite to the recognizable direction of the document based on the scanning method information. The vertical inversion unit of the information processing device vertically inverts the image data of a page when the recognizable direction of the image data of the page is judged to be opposite to the recognizable direction of the document by the second recognizable direction judgment unit.

With the above configuration, by letting the document scanning device output the scanning method information and letting the information processing device vertically invert the image data of a page when the recognizable direction of the image data of the page is judged to be opposite to that of the document based on the scanning method information, the image data of the front and back pages can be adjusted to be in the same recognizable direction (standard recognizable direction) appropriately for the double-side scanning method of the document scanning device when the recognizable directions of the front and back pages are opposite to each other.

In at least one aspect, the information processing device further includes a first storage unit which stores information indicating whether or not the recognizable direction of the image data of the back page is opposite to the recognizable direction of the document while associating the information with possible pieces of scanning method information. The second recognizable direction judgment unit of the information processing device judges that the recognizable direction of the image data of the back page is opposite to the recognizable direction of the document when the information stored in the first storage unit being associated with the scanning method information received from the document scanning device indicates the fact.

With the above configuration, by vertically inverting the image data of the back page based on the information (indicating whether or not the recognizable direction of the image data of the back page is opposite to that of the document) stored in the first storage unit being associated with the scanning method information received from the document scanning device, the image data of the back page can be adjusted to be in the same recognizable direction as the front page (standard recognizable direction) appropriately for the double-side scanning method of the document scanning device when the recognizable directions of the front and back pages are opposite to each other.

In at least one aspect, the information processing device further includes a document binding information receiving unit which receives document binding information indicating whether the double-sided document is a long edge-bound document or a short edge-bound document. The second recognizable direction judgment unit of the information processing device makes the judgment on whether or not the recognizable direction of the image data of each page is opposite to the recognizable direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the second recognizable direction judgment unit make the judgment based also on the document binding information indicating whether the double-sided document is a long edge-bound document or a short edge-bound document.

In at least one aspect, the -recognizable direction adjustment information outputting unit of the document scanning device outputs type information, which represents the type of the document scanning device and takes on different values depending on the type, as the recognizable direction adjustment information. The recognizable direction adjustment information receiving unit of the information processing device receives the type information as the recognizable direction adjustment information. The information processing device further includes a third recognizable direction judgment unit which judges whether or not the recognizable direction of the image data of each page is opposite to the recognizable direction of the document based on the type information. The vertical inversion unit of the information processing device vertically inverts the image data of a page when the recognizable direction of the image data of the page is judged to be opposite to the recognizable direction of the document by the third recognizable direction judgment unit.

With the above configuration, by letting the document scanning device output the type information and letting the information processing device vertically invert the image data of a page when the recognizable direction of the image data of the page is judged to be opposite to that of the document based on the type information, the image data of the front and back pages can be adjusted to be in the same recognizable direction (standard recognizable direction) appropriately for the type of the document scanning device when the recognizable directions of the front and back pages are opposite to each other.

In at least one aspect, the information processing device further includes a second storage unit which stores information indicating whether or not the recognizable direction of the image data of the back page is opposite to the recognizable direction of the document while associating the information with possible pieces of type information. The third recognizable direction judgment unit of the information processing device judges that the recognizable direction of the image data of the back page is opposite to the recognizable direction of the document when the information stored in the second storage unit being associated with the type information received from the document scanning device indicates the fact.

With the above configuration, by vertically inverting the image data of the back page based on the information (indicating whether or not the recognizable direction of the image data of the back page is opposite to that of the document) stored in the second storage unit being associated with the type information received from the document scanning device, the image data of the back page can be adjusted to be in the same recognizable direction as the front page (standard recognizable direction) appropriately for the type of the document scanning device when the recognizable directions of the front and back pages are opposite to each other.

In at least one aspect, the information processing device further includes a document binding information receiving unit which receives document binding information indicating whether the double-sided document is a long edge-bound document or a short edge-bound document. The third recognizable direction judgment unit of the information processing device makes the judgment on whether or not the recognizable direction of the image data of each page is opposite to the recognizable direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the third recognizable direction judgment unit make the judgment based also on the document binding information indicating whether the double-sided document is a long edge-bound document or a short edge-bound document.

In at least one aspect, the document scanning device further includes a reading direction adjustment information outputting unit which outputs reading direction adjustment information as information to be used for adjusting a reading direction of the image data of the back page, in a state in which the recognizable direction of the image data of the back page has been adjusted to the standard recognizable direction, to a standard reading direction which is defined as the reading direction of the image data of the front page. The information processing device further includes: a reading direction adjustment information receiving unit which receives the reading direction adjustment information outputted by the document scanning device; and a horizontal inversion unit which horizontally inverts the image data of the back page as needed based on the reading direction adjustment information so that the reading direction of the image data of the back page will be in the standard reading direction.

With the above configuration, even when the reading direction of the image data of the back page outputted by the document scanning device is opposite to that of the image data of the front page, the image data of the back page can be adjusted to be in the same reading direction as the image data of the front page (standard reading direction) by the information processing device (receiving the image data and the reading direction adjustment information outputted by the document scanning device) by horizontally inverting the image data of the back page based on the reading direction adjustment information.

In at least one aspect, the reading direction adjustment information outputting unit of the document scanning device outputs reading direction information, which takes on different values depending on whether the reading direction of the image data of each page is the same as or opposite to the reading direction of the document, as the reading direction adjustment information. The reading direction adjustment information receiving unit of the information processing device receives the reading direction information as the reading direction adjustment information. The information processing device further includes a first reading direction judgment unit which judges whether or not the reading direction of the image data of each page is opposite to the reading direction of the document based on the reading direction information. The horizontal inversion unit of the information processing device horizontally inverts the image data of a page when the reading direction of the image data of the page is judged to be opposite to the reading direction of the document by the first reading direction judgment unit.

With the above configuration, by letting the document scanning device output the reading direction information and letting the information processing device horizontally invert the image data of a page when the reading direction of the image data of the page is judged to be opposite to that of the document based on the reading direction information, the image data of the front and back pages can be adjusted to be in the same reading direction (standard reading direction) irrespective of the double-side scanning method of the document scanning device when the reading directions of the front and back pages are opposite to each other.

In at least one aspect, the information processing device further includes a document binding information receiving unit which receives document binding information indicating whether the double-sided document is a long edge-bound document or a short edge-bound document. The first reading direction judgment unit of the information processing device makes the judgment on whether or not the reading direction of the image data of each page is opposite to the reading direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the first reading direction judgment unit make the judgment based also on the document binding information indicating whether the double-sided document is a long edge-bound document or a short edge-bound document.

In at least one aspect, the reading direction adjustment information outputting unit of the document scanning device outputs scanning method information, which represents a double-side scanning method of the document scanning device and takes on different values depending on the scanning method, as the reading direction adjustment information. The reading direction adjustment information receiving unit of the information processing device receives the scanning method information as the reading direction adjustment information. The information processing device further includes a second reading direction judgment unit which judges whether or not the reading direction of the image data of each page is opposite to the reading direction of the document based on the scanning method information. The horizontal inversion unit of the information processing device horizontally inverts the image data of a page when the reading direction of the image data of the page is judged to be opposite to the reading direction of the document by the second reading direction judgment unit.

With the above configuration, by letting the document scanning device output the scanning method information and letting the information processing device horizontally invert the image data of a page when the reading direction of the image data of the page is judged to be opposite to that of the document based on the scanning method information, the image data of the front and back pages can be adjusted to be in the same reading direction (standard reading direction) appropriately for the double-side scanning method of the document scanning device when the reading directions of the front and back pages are opposite to each other.

In at least one aspect, the information processing device further includes a third storage unit which stores information indicating whether or not the reading direction of the image data of the back page is opposite to the reading direction of the document while associating the information with possible pieces of scanning method information. The second reading direction judgment unit of the information processing device judges that the reading direction of the image data of the back page is opposite to the reading direction of the document when the information stored in the third storage unit being associated with the scanning method information received from the document scanning device indicates the fact.

With the above configuration, by horizontally inverting the image data of the back page based on the information (indicating whether or not the reading direction of the image data of the back page is opposite to that of the document) stored in the third storage unit being associated with the scanning method information received from the document scanning device, the image data of the back page can be adjusted to be in the same reading direction as the front page (standard reading direction) appropriately for the double-side scanning method of the document scanning device when the reading directions of the front and back pages are opposite to each other.

In at least one aspect, the information processing device further includes a document binding information receiving unit which receives document binding information indicating whether the double-sided document is a long edge-bound document or a short edge-bound document. The second reading direction judgment unit of the information processing device makes the judgment on whether or not the reading direction of the image data of each page is opposite to the reading direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the second reading direction judgment unit make the judgment based also on the document binding information indicating whether the double-sided document is a long edge-bound document or a short edge-bound document.

In at least one aspect, the reading direction adjustment information outputting unit of the document scanning device outputs type information, which represents the type of the document scanning device and takes on different values depending on the type, as the reading direction adjustment information. The reading direction adjustment information receiving unit of the information processing device receives the type information as the reading direction adjustment information. The information processing device further includes a third reading direction judgment unit which judges whether or not the reading direction of the image data of each page is opposite to the reading direction of the document based on the type information. The horizontal inversion unit of the information processing device horizontally inverts the image data of a page when the reading direction of the image data of the page is judged to be opposite to the reading direction of the document by the third reading direction judgment unit.

With the above configuration, by letting the document scanning device output the type information and letting the information processing device horizontally invert the image data of a page when the reading direction of the image data of the page is judged to be opposite to that of the document based on the type information, the image data of the front and back pages can be adjusted to be in the same reading direction (standard reading direction) appropriately for the type of the document scanning device when the reading directions of the front and back pages are opposite to each other.

In at least one aspect, the information processing device further includes a fourth storage unit which stores information indicating whether or not the reading direction of the image data of the back page is opposite to the reading direction of the document while associating the information with possible pieces of type information. The third reading direction judgment unit of the information processing device judges that the reading direction of the image data of the back page is opposite to the reading direction of the document when the information stored in the fourth storage unit being associated with the type information received from the document scanning device indicates the fact.

With the above configuration, by horizontally inverting the image data of the back page based on the information (indicating whether or not the reading direction of the image data of the back page is opposite to that of the document) stored in the fourth storage unit being associated with the type information received from the document scanning device, the image data of the back page can be adjusted to be in the same reading direction as the front page (standard reading direction) appropriately for the type of the document scanning device when the reading directions of the front and back pages are opposite to each other.

In at least one aspect, the information processing device further includes a document binding information receiving unit which receives document binding information indicating whether the double-sided document is a long edge-bound document or a short edge-bound document. The third reading direction judgment unit of the information processing device makes the judgment on whether or not the reading direction of the image data of each page is opposite to the reading direction of the document based also on the document binding information.

With the above configuration, the image data of the front and back pages can be adjusted to be in the same recognizable direction (standard recognizable direction) properly for both long edge-bound documents (long edge documents) and short edge-bound documents (short edge documents), by letting the third reading direction judgment unit make the judgment based also on the document binding information indicating whether the double-sided document is a long edge-bound document or a short edge-bound document.

Embodiment

Referring now to the drawings, a description will be given in detail of a preferred embodiment in accordance with the present invention.

(1) Composition of Document Scanning System

Figure 1:
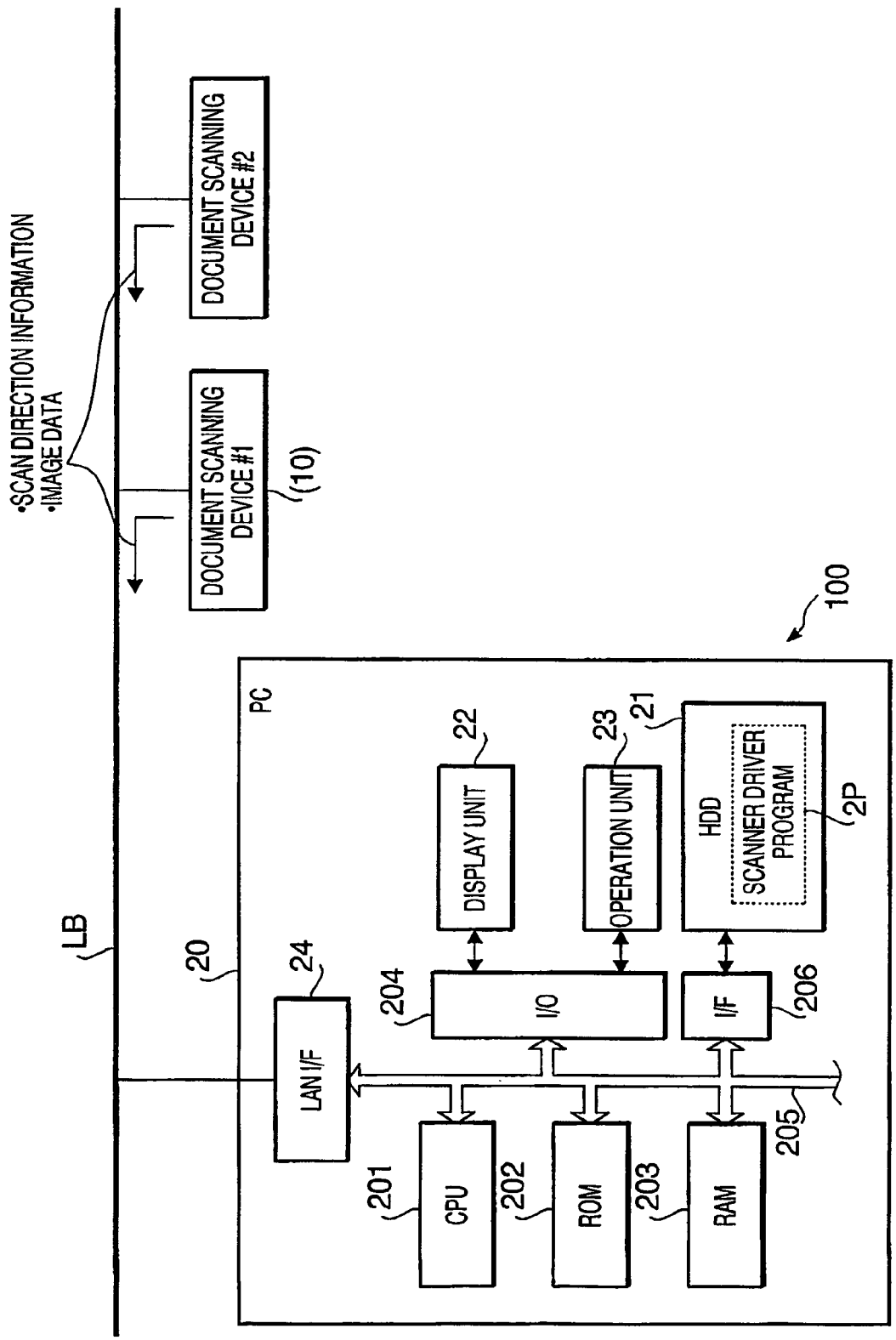
FIG. 1 is a block diagram showing the composition of a document scanning system in accordance with an embodiment.

FIG. 1 is a block diagram showing the composition of a document scanning system in accordance with an embodiment of the present invention. The document scanning system 100 shown in FIG. 1 includes a plurality of document scanning devices 10 and a PC (Personal Computer) 20 as an information processing device. In the PC 20, a general-purpose scanner driver program 2P, capable of controlling various types of document scanning devices (such as the document scanning devices #1 and #2 shown in FIG. 1), has been installed. The document scanning devices #1 and #2 are devices supporting double-side scanning (image scanning on both sides of a document).

(1-1) Information Processing Device

On the left-hand side of FIG. 1, an example of the electrical configuration of the PC 20 as an information processing device is shown. The PC 20 includes a microprocessor, in which a CPU (Central Processing Unit) 201, a ROM (Read Only Memory) 202, a RAM (Random Access Memory) 203 and an I/O (Input/Output) port 204 are connected together by a bus 205. The bus 205 inside the PC 20 is connected to a communication line LB (which forms a LAN (Local Area Network)) via a LAN I/F (interface) 24. The ROM 202 stores various programs to be executed by the CPU 201 and data necessary for the programs. The RAM 203 is used as work areas when the programs are executed by the CPU 201. To the I/O port 204, a display unit 22 (LCD (Liquid Crystal Display), etc.) and an operation unit 23 (mouse, keyboard, etc.) are connected.

To the bus 205 of the PC 20, an HDD (Hard Disk Drive) 21 is connected via an I/F 206. In the HDD 21, the aforementioned general-purpose scanner driver program 2P (capable of controlling various types of document scanning devices such as the document scanning devices #1 and #2 shown in FIG. 1) is installed together with an unshown OS (Operating System) and various application programs.

The CPU 201 executes various processes (steps), such as making judgments regarding a "recognizable direction" and a "reading direction" (explained later) of a document and horizontally and/or vertically inverting image data of the document received from a document scanning device. The CPU 201 is capable of receiving various data via the LAN I/F 24 and the I/O port 204. For example, the CPU 201 receives image data of a document, "recognizable direction information" as recognizable direction adjustment information and "reading direction information" as reading direction adjustment information (explained later) via the LAN I/F 24 and receives "document binding information" (explained later) via the operation unit 23 and the I/O port 204.

(1-2) Document Scanning Device

Figure 2:
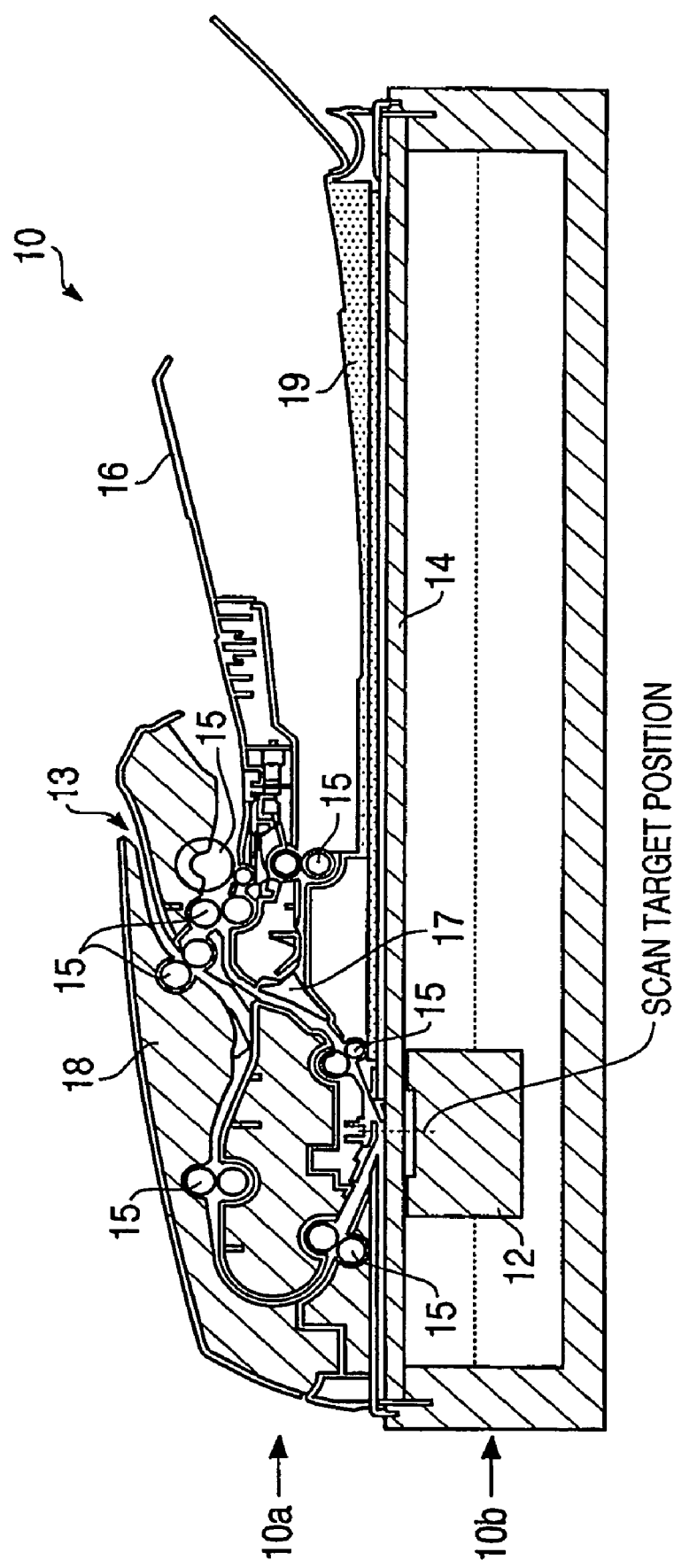
FIG. 2 is a cross-sectional view schematically showing the composition of a scanner unit of a document scanning device included in the document scanning system of FIG. 1.

The document scanning device 10 in this embodiment is configured as an MFP (Multi Function Peripheral) having various functions (scanner function, etc.) in one body. FIG. 2 is a cross-sectional view schematically showing the composition of a scanner unit of the document scanning device 10.

The document scanning device 10 shown in FIG. 2 is of a type having both a FB (Flat Bed) and an ADF (Automatic Document Feeder). The document scanning device 10 is mainly composed of a flat bed unit 10b and a cover unit 10a which is attached to the flat bed unit 10b to be freely opened and closed. The flat bed unit 10b is provided with a CIS (Contact Image Sensor) 12 as a scanning unit, platen glass 14, etc. The cover unit 10a is provided with a document supply tray 16, a document feeding mechanism 18, a document output tray 19, etc.

The CIS 12 of the flat bed unit 10b includes a photoreceptor unit (photoelectric transducers), a CELFOC lens and a light source which are not shown in FIG. 2. The CIS 12 emits light from the light source onto a document placed at a scan target position and scans an image on the document (reads an image from the document) by letting the CELFOC lens focus reflected light from the document on the photoreceptor unit. The CIS 12 may also be replaced with an image sensor employing a reducing optical system, such as a CCD (Charge-Coupled Device) sensor.

The CIS 12 is driven by an unshown driving mechanism to move to and fro in the horizontal direction (rightward and leftward) in FIG. 2, by which the photoreceptor unit can be placed right under the scan target position when the document scanning is executed by use of the ADF.

Inside the document feeding mechanism 18 of the cover unit 10a, a feeding path for feeding the document from the document supply tray 16 to the document output tray 19 is formed. A plurality of feeding rollers 15 and a switching nail 17 are placed along the feeding path to properly feed the document. The document being fed along the feeding path eventually passes through the scan target position on the platen glass 14, at which the image on the document is scanned by the CIS 12 placed below.

The document feeding mechanism 18 is capable of feeding the document so as to let the CIS 12 scan both sides of the document, by properly moving the feeding rollers 15 and the switching nail 17. Specifically, the document feeding mechanism 18 first feeds the document to let the CIS 12 (placed in the middle of the feeding path) scan an image on the first surface of the document, turns over the document, and feeds the document again to let the CIS 12 scan an image on the second surface of the document. In this embodiment, the first surface of the document (which is scanned by the CIS 12 first) will also be referred to as a "front side" and the second surface (which is scanned next) will also be referred to as a "back side".

Figure 3A:
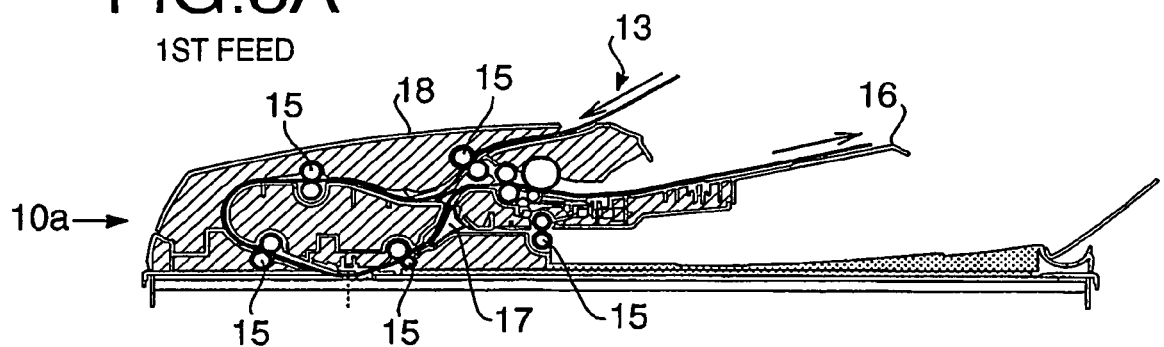
FIGS. 3A-3C are cross-sectional views for explaining a document feeding process executed by a document feeding mechanism of the document scanning device of FIG. 2.
Figure 3B:
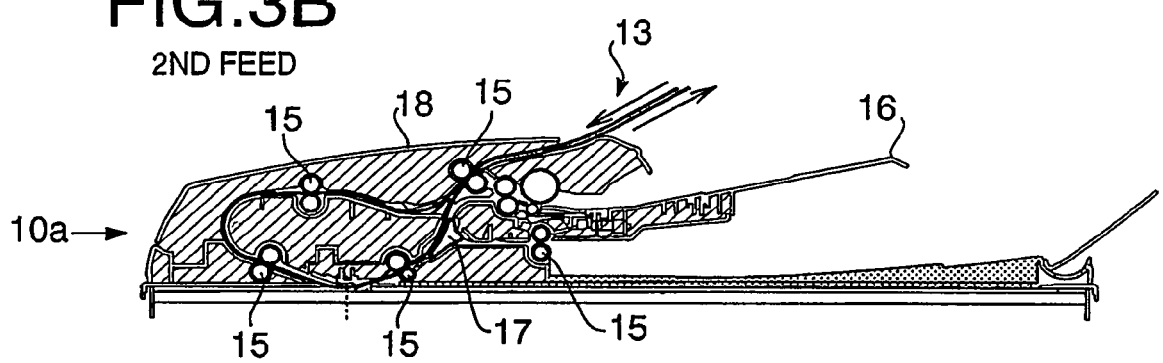
Figure 3C:
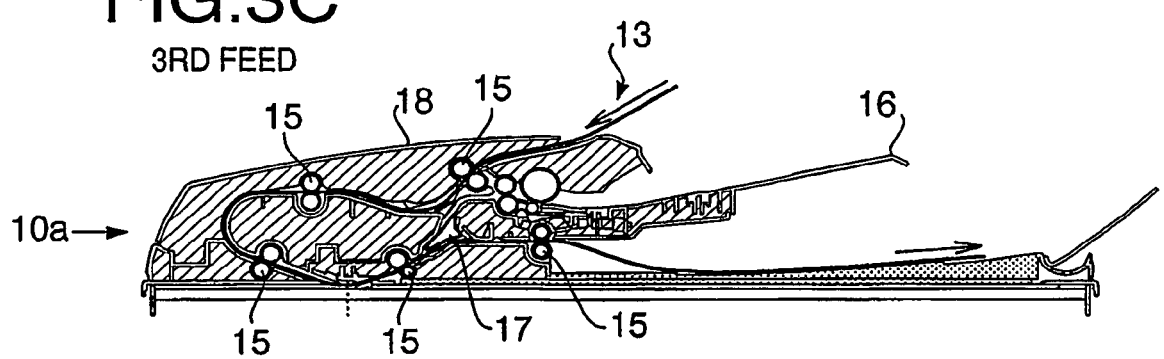

FIGS. 3A-3C are cross-sectional views for explaining a document feeding process executed by the document feeding mechanism 18, wherein only the cover unit 10a of the document scanning device 10 is shown. The document feeding process is mainly composed of the following three steps. First, as shown in FIG. 3A, the document set in the document supply tray 16 (with its front side facing upward) is pulled into the feeding path, the front side of the document is scanned by the CIS 12, and the document is ejected to a turnover port 13. Next, as shown in FIG. 3B, the document is turned over around an axis orthogonal to the document feeding direction by pulling the document from the turnover port 13 into the feeding path, the back side of the document is scanned by the CIS 12, and the document is ejected to the turnover port 13 again. Finally, as shown in FIG. 3C, the document is turned over again by pulling the document from the turnover port 13 into the feeding path and the document (with its front side facing downward) is ejected to the document output tray 19 (with no image scanning by the CIS 12).

Figure 4:
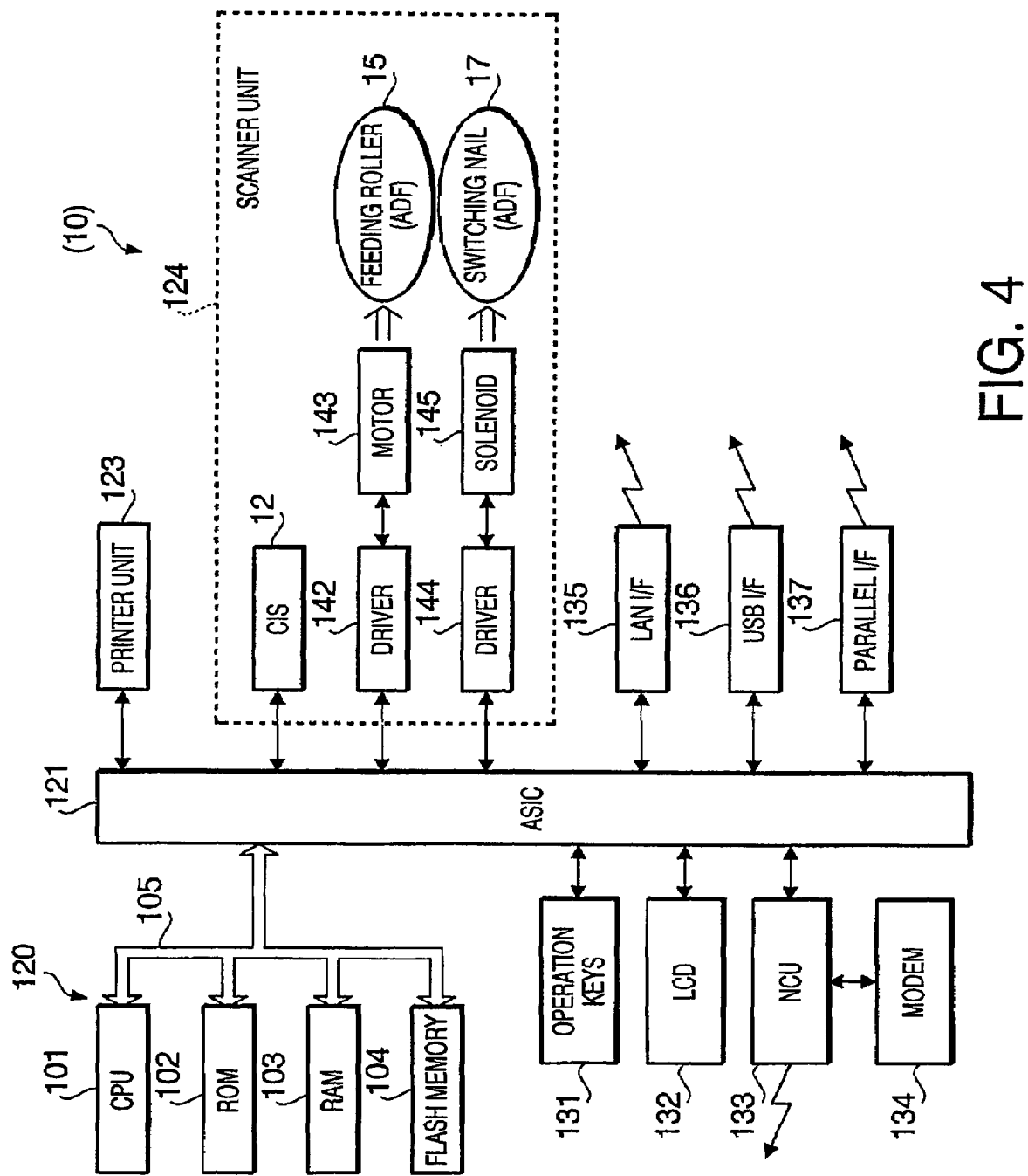
FIG. 4 is a block diagram showing the electrical configuration of an MFP (Multi Function Peripheral) as the document scanning device of FIG. 2.

FIG. 4 is a block diagram showing the electrical configuration of the MFP as the document scanning device 10. In the MFP, a control unit 120 (for controlling the operation of the MFP), a printer unit 123 (implementing the printer function), a scanner unit 124 (implementing the scanner function), etc. are connected to an ASIC (Application-Specific Integrated Circuit) 121.

The control unit 120 is configured as a microprocessor, in which a CPU 101, a ROM 102, a RAM 103 and a flash memory 104 are connected together by a bus 105. The ROM 102 stores programs to be executed by the CPU 101 and data necessary for the programs. The RAM 103 is used as work areas when the programs are executed by the CPU 101.

The CPU 101 outputs an electric signal (necessary for the light emission by the light source of the CIS 12) and a timing signal (instructing the photoelectric transducers of the CIS 12 to output image data) to the CIS 12 of the scanner unit 124 via the ASIC 121. The CIS 12 receiving the signals emits light onto the document at prescribed timing and outputs the image data generated by the photoelectric transducers.

The CPU 101 also outputs actuating signals to a driver 142 (for driving motors 143 of the feeding rollers 15) and a driver 144 (for driving a solenoid 145 of the switching nail 17) via the ASIC 121. Further, the CPU 101 outputs an actuating signal to a motor (unshown) of the driving mechanism for the to-and-fro movement of the CIS 12.

To the ASIC 121, a LAN I/F 135 for communicating data with the PC 20, etc. on the LAN via the LAN cable (communication line LB, see FIG. 1) is also connected. Further, a USB I/F 136 is connected to the ASIC 121, by which data communication with the PC 20, etc. via a USB cable is enabled.

Further, operation keys 131 and an LCD (Liquid Crystal Display) 132 mounted on an operation panel (unshown) on the exterior surface of the MFP are connected to the ASIC 121. Specifically, the operation keys 131 are connected to the ASIC 121 via a panel gate array (unshown) which detects the pressing of the keys and thereby outputs corresponding code signals. The LCD 132 is connected to the ASIC 121 via an LCD controller (unshown) which executes display control. The user can operate the MFP by pressing the operation keys 131.

Also connected to the ASIC 121 are a parallel I/F 137 for communicating data with a computer via a parallel cable and an NCU (Network Control Unit) 133 and a modem 134 for implementing the facsimile function.

The CPU 101 is capable of outputting various data, such as image data of a document, the recognizable direction information (as the recognizable direction adjustment information) and the reading direction information (as the reading direction adjustment information), via the LAN I/F 135.

Methods of the double-side scanning (scanning images on both sides of a document) will be explained below referring to FIGS. 5A-5D. The scanning methods can be roughly classified into two groups: scanning methods #2 and #4 (see FIGS. 5B and 5D) and scanning methods #1 and #3 (see FIGS. 5A and 5C). In FIGS. 5A-5D, arrows M represent the image scanning direction (main scanning direction) and arrows S represent the document feeding direction (sub scanning direction). A triangular mark on the document P represents a position corresponding to the upper left corner of the first surface (front side). The triangular mark is indicated not only on the first surface (front side) but also on the second surface (back side) in FIGS. 5A-5D.

In the scanning methods #2 and #4 (FIGS. 5B and 5D), the document P is fed by an ADF (Automatic Document Feeder) to a scanning unit LS placed in the middle of the feeding path, the first surface (front side) of the document P is scanned by the scanning unit LS, the document P is turned over; and thereafter the second surface (back side) of the document P is scanned by the same scanning unit LS, similarly to the aforementioned method employed by the document scanning device 10 of this embodiment. In this case, the sub scanning direction S (vertical direction of the document P) in the back side scan (i.e. the scanning of the back side of the document P) is opposite to that in the front side scan (i.e. the scanning of the front side of the document P).

The difference between the scanning methods #2 and #4 is that the image scanning direction (main scanning direction) M of the scanning unit LS is switched between the scanning of the first surface (front side) and the scanning of the second surface (back side) in the scanning method #4 while the image scanning direction is not switched in the scanning method #2. The switching of the image scanning direction (main scanning direction) M is realized by changing the direction (order) of the successive discharging of electric charges (representing the amount of received light) from photoreceptors of the scanning unit LS arranged in the image scanning direction.

Meanwhile, in the scanning methods #1 and #3 (FIGS. 5A and 5C), the document P is fed by an ADF to a pair of scanning units LS1 and LS2 placed in the middle of the feeding path and the first and second surfaces (front and back sides) of the document P are simultaneously scanned by the scanning units LS1 and LS2, respectively. In this case, the sub scanning direction S (vertical direction of the document P) in the back side scan is the same as that in the front side scan. The scanning method #1 differs from the scanning method #3 in that the image scanning directions (main scanning directions) M of the scanning units LS1 and LS2 are opposite to each other.

Examples of image data generated by the double-side scanning according to the scanning methods #1-#4 are shown on the left-hand side of FIGS. 6 and 7. FIG. 6 shows examples of a double-sided document which is designed to be opened around its long edge (long side), that is, designed to be bound to other documents along its long edge (hereinafter referred to as a "long edge document"), while FIG. 7 shows examples of a double-sided document which is designed to be opened around its short edge (short side), that is, designed to be bound to other documents along its short edge (hereinafter referred to as a "short edge document"). In the examples, a character "F" printed on each of the first and second surfaces (front and back sides) has been scanned by a scanning unit.

An imaginarily developed view of the long edge document, imaginarily showing both the front and back sides of the long edge document together (with the back side imaginarily turned over around a long edge LE of the document), is shown at the top of FIG. 6. The long edge document is a document designed assuming that a reader who is reading characters (e.g. character "F") on the front side turns over the document around the long edge LE of the document to read characters (e.g. character "F") on the back side. In order to let the reader (turning over the document around the long edge LE to read the back side) normally read the character "F" on the back side, the character "F" has to be printed on the back side in the same "recognizable direction" (direction of recognition of each character, heading from the bottom to the top of each character) and "reading direction" (direction of progress of reading characters), heading from the left to the right of each character) as the character "F" on the front side.

In other words, when the long edges of the long edge document are in the document feeding direction (sub scanning direction) S as in FIGS. 5A-5D, if the document is imaginarily developed (turned over) around an axis in the sub scanning direction S, the recognizable direction and the reading direction of each character or image on the back side coincides with those of each character or image on the front side.

Meanwhile, an imaginarily developed view of the short edge document, imaginarily showing both the front and back sides of the short edge document together (with the back side imaginarily turned over around a short edge SE of the document), is shown at the top of FIG. 7. The short edge document is a document designed assuming that a reader who is reading characters (e.g. character "F") on the front side turns over the document around the short edge SE of the document to read characters (e.g. character "F") on the back side. In order to let the reader (turning over the document around the short edge SE to read the back side) normally read the character "F" on the back side, the character "F" has to be printed on the back side in the opposite recognizable direction and reading direction compared to the character "F" on the front side.

In other words, when the long edges of the short edge document are in the document feeding direction (sub scanning direction) S as in FIGS. 5A-5D, if the document is imaginarily developed (turned over) around an axis in the main scanning direction M (see FIGS. 5A-5D), the recognizable direction and the reading direction of each character or image on the back side coincides with those of each character or image on the front side.

In the above cases where the long edges of the document (long edge document or short edge document) are in the document feeding direction (sub scanning direction) S as in FIGS. 5A-5D, image data (scanned image data) shown on the left-hand side of FIGS. 6 and 7 are generated by the double-side scanning of the documents (long edge document and short edge document) by the scanning methods #1-#4. Incidentally, in each example on the left-hand side of FIG. 6 or 7, the state of the image data (scanned image data) of the second surface (back side) is shown assuming that the image data of the first surface (front side) has successfully been generated by the scanning in a state letting a human recognize that the image data is in the normal direction (e.g. when the image data is directly printed on paper as shown in the figures).

As shown on the left-hand side of FIGS. 6 and 7, the image data of the second surface (back side) obtained by the scanning methods #1-#4 are generally inverted from the normal state (letting a human recognize that the image data is in the normal direction) horizontally and/or vertically. If the image data is directly displayed on the display unit 22 of the PC 20, the user has to manually correct the direction of the image data and that is very troublesome to the user. Therefore, the document scanning device 10 and the PC 20 forming the document scanning system 100 of this embodiment properly execute an inversion process to the image data of the second surface (back side) as explained below.

(2) Operation of Document Scanning System

Figure 10:
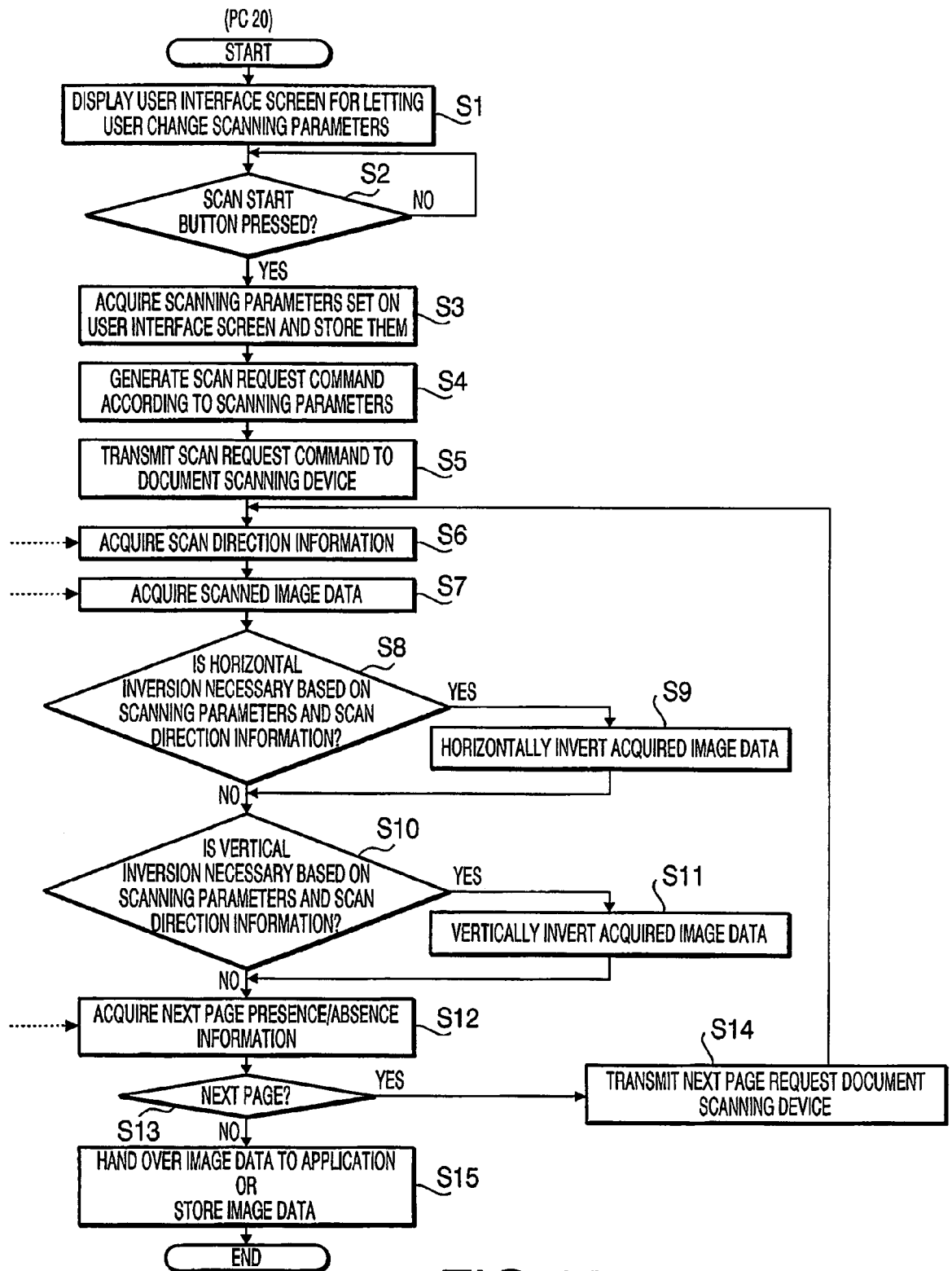
FIG. 10 is a flow chart showing a process executed by a PC (information processing device) in the document scanning system of FIG. 1.
Figure 11:
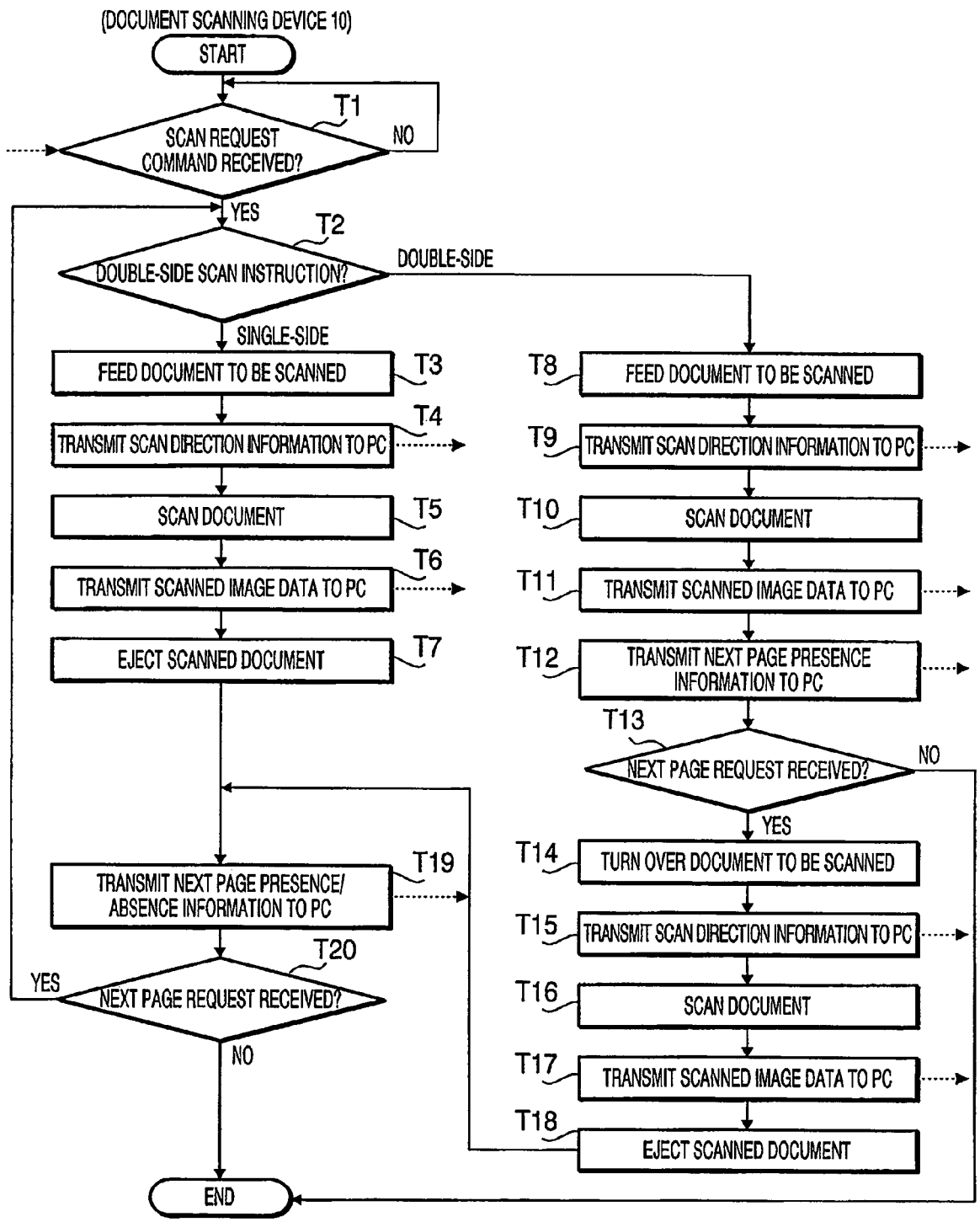
FIG. 11 is a flow chart showing a process executed by the document scanning device.

The operation of the document scanning device 10 and the PC 20 forming the document scanning system 100 will be described below referring to FIGS. 10 and 11. FIG. 10 is a flow chart showing a process executed by the PC 20 (information processing device). FIG. 11 is a flow chart showing a process executed by the document scanning device 1 0.

(2-1) Process Executed by Information Processing Device

Figure 9:
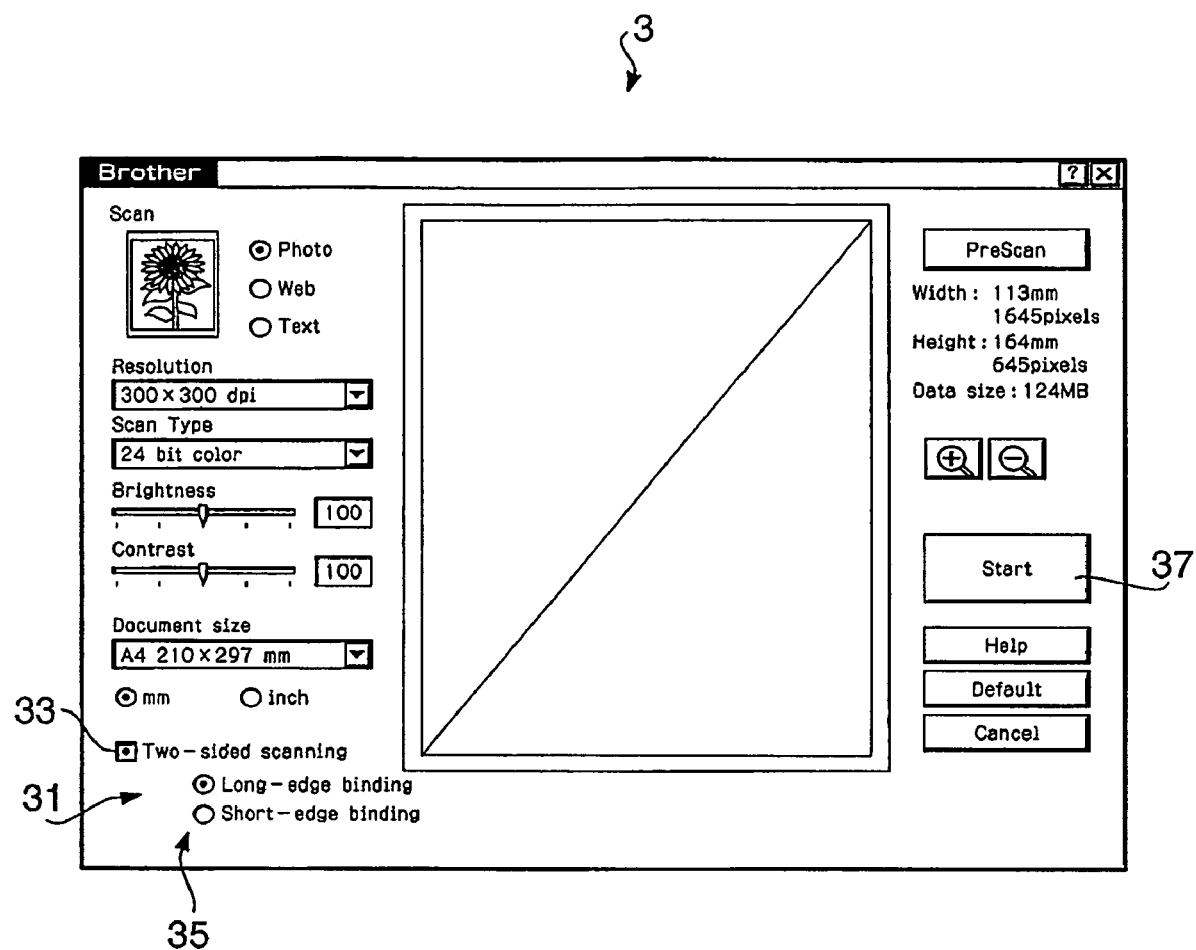
FIG. 9 is a screen image showing a user interface screen which is displayed on a display unit of the PC for letting the user change settings of scanning parameters.

Referring to FIG. 10, the PC 20 (information processing device) activating the scanner driver program 2P first displays a user interface screen 3 (for letting the user change the settings of scanning parameters) on the display unit 22 as shown in FIG. 9 (S1).

The user interface screen 3 allows the user to set various parameters necessary for the image scanning (scanning parameters). The user interface screen 3 includes a double-side scan setting area 31 for letting the user set scanning parameters for the double-side scanning. The double-side scan setting area 31 includes a check box 33 for specifying whether or not to execute the double-side scanning and radio buttons 35 for specifying whether the document to be scanned is a long edge document or a short edge document.

When the pressing of a scan start button 37 on the user interface screen 3 (by the user operating the operation unit 23) is detected (S2: YES), the PC 20 acquires the scanning parameters which have been set on the user interface screen 3 and stores the acquired scanning parameters in the RAM 203 (S3), by which "document binding information" indicating whether the document is a long edge document or a short edge document is also acquired by the PC 20.

Subsequently, the PC 20 generates a scan request command according to the stored scanning parameters (S4) and transmits the scan request command to the document scanning device 10 (S5/→T1). The operation of the document scanning device 10 receiving the scan request command will be described later.

Subsequently, the PC 20 acquires "scan direction information" outputted by the document scanning device 10 (S6/T4, T9, T15→). The "scan direction information" received from the document scanning device 10 conceptually includes the "recognizable direction information" (as the recognizable direction adjustment information) and "reading direction information" (as the reading direction adjustment information).

The recognizable direction information is information which takes on different values depending on whether the recognizable direction of the image data is the same as or opposite to that of the document. In other words, the recognizable direction information takes on different values depending on whether the scan direction in the back side scan is the same as or opposite to that in the front side scan in regard to the vertical direction (sub scanning direction S) as shown on the right-hand side of FIGS. 5A-5D. Meanwhile, the reading direction information is information which takes on different values depending on whether the reading direction of the image data is the same as or opposite to that of the document. In other words, the reading direction information takes on different values depending on whether the scan direction in the back side scan is the same as or opposite to that in the front side scan in regard to the horizontal direction (main scanning direction M) as shown on the right-hand side of FIGS. 5A-5D.

Subsequently, the PC 20 acquires the image data generated by the document scanning device 10 by the scanning of the document (S7/T6, T11, T17→).

When single-side scanning is executed by the document scanning device 10 (T4) or when the front side of a double-sided document is scanned by the document scanning device 10 in the double-side scanning (T9), the scan direction information acquired by the PC 20 in the step S6 represents ordinary scanning, that is, indicates that the image data is in the normal state (not inverted in the horizontal direction nor in the vertical direction). Therefore, the PC 20 acquiring the image data in the step S7 advances to step S12 without executing the inversion process to the acquired image data (S8: NO, S10: NO).

On the other hand, when the back side of a double-sided document is scanned by the document scanning device 10 in the double-side scanning (T15), the scan direction information acquired by the PC 20 in the step S6 includes information about the scan direction in the back side scan, that is, information regarding whether or not the image data is inverted in the horizontal direction and/or in the vertical direction. Therefore, the PC 20 acquiring the image data in the step S7 executes the inversion process to the acquired image data based on the scan direction information and the scanning parameters which have been set on the user interface screen 3 (specifically, the setting of the radio buttons 35 (document binding information)) (S8-S11).

Figure 8:
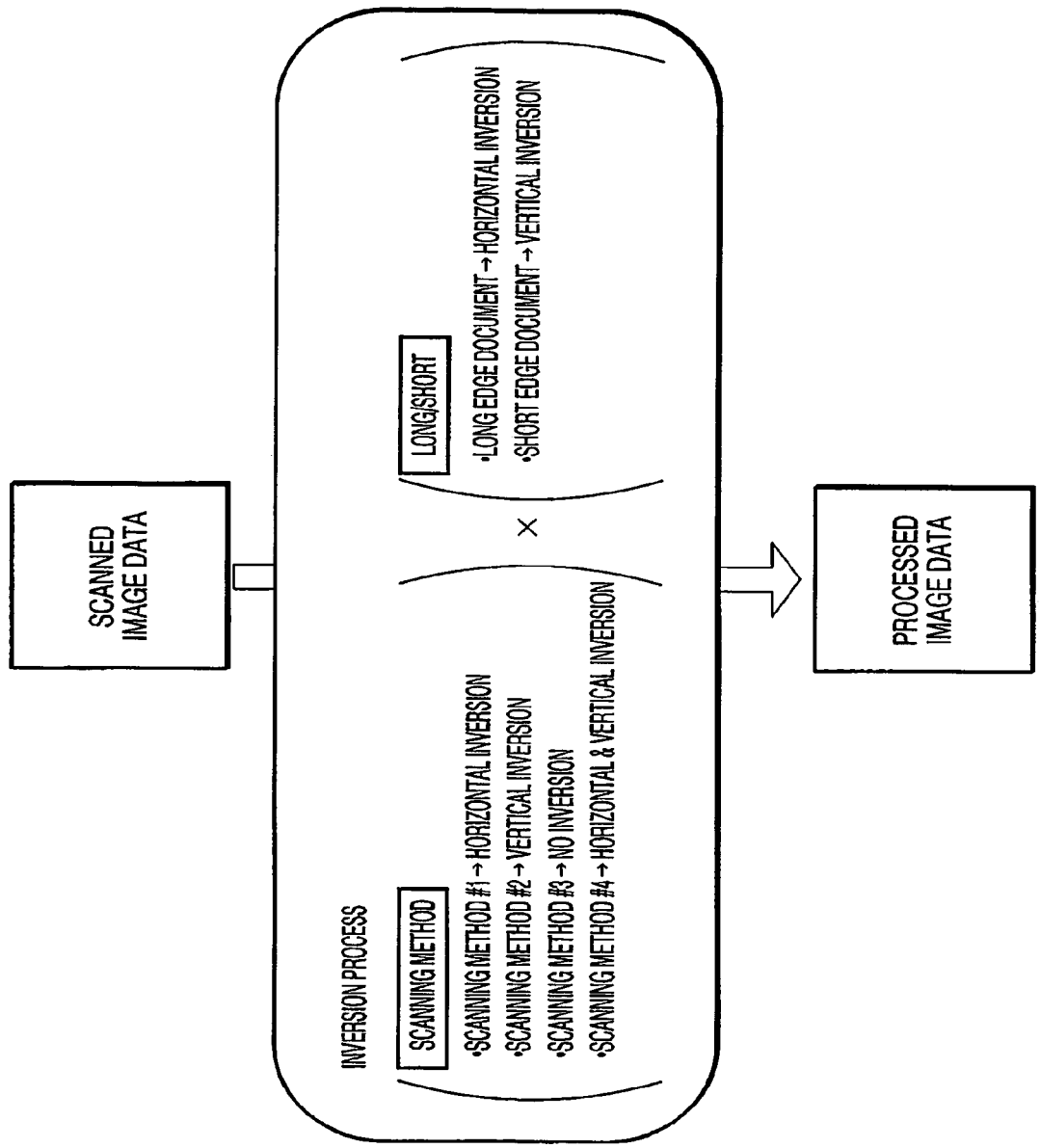
FIG. 8 is a schematic diagram for explaining the inversion process.

The inversion process is executed based on the document binding information and the scan direction information as shown in FIG. 8. Specifically, a factor regarding the scan direction information is set at "horizontal inversion" when the scanning method of the document scanning device 10 is the scanning method #1, "vertical inversion" when the scanning method is the scanning method #2, "no inversion" when the scanning method is the scanning method #3, and "horizontal & vertical inversion" when the scanning method is the scanning method #4. Meanwhile, a factor regarding the document binding information is set at "horizontal inversion" when the scanned document is a long edge document, and "vertical inversion" when the scanned document is a short edge document. The inversion to be executed in the inversion process is determined by multiplying the above two factors together. The PC 20 judges whether the horizontal inversion is necessary or not (S8) and whether the vertical inversion is necessary or not (S 10) based on the product of the factors, and executes necessary inversion to the image data (S9, S11).

The inversion of the image data can be executed as follows. When the two-dimensional coordinates of each pixel forming the image data are represented as $F[X_i, Y_j]$ (X: coordinate in the horizontal direction ($1 \leq i \leq imax$), Y: coordinate in the vertical direction ($1 \leq j \leq jmax$)), the horizontal inversion can be implemented by generating image data formed by pixels placed at $F[X_{imax+1-i}, Y_j]$ (by interchanging each pair of corresponding pixels in the X direction). The vertical inversion can be implemented by generating image data formed by pixels placed at $F[X_i, Y_{jmax+1-j}]$ (by interchanging each pair of corresponding pixels in the Y direction).

The steps S8-S11 in the process of FIG. 10 will be explained below in detail.

In the step S8, the PC 20 judges whether or not the horizontal inversion of the image data is necessary, that is, whether or not the reading direction of the image data is opposite to that of the document. Specifically, the PC 20 first judges whether or not the scan direction in the back side scan is opposite to that in the front side scan in regard to the horizontal direction (main scanning direction M) based on the acquired scan direction information (reading direction information), and judges that the horizontal inversion of the image data is necessary (i.e. the reading direction of the image data is opposite to that of the document) (S8: YES) when the first judgment on the scan direction (main scanning direction M) is "opposite" and the acquired document binding information represents a short edge document and when the first judgment on the scan direction (main scanning direction M) is "not opposite" and the acquired document binding information represents a long edge document.

When the horizontal inversion is necessary (S8: YES), the PC 20 horizontally inverts the image data of the back side (S9), by which the reading direction of the image data of the back side is adjusted to that of the image data of the front side (standard reading direction: rightward).

In the step S10, the PC 20 judges whether or not the vertical inversion of the image data is necessary, that is, whether or not the recognizable direction of the image data is opposite to that of the document. Specifically, the PC 20 first judges whether or not the scan direction in the back side scan is opposite to that in the front side scan in regard to the vertical direction (sub scanning direction S) based on the acquired scan direction information (recognizable direction information), and judges that the vertical inversion of the image data is necessary (i.e. the recognizable direction of the image data is opposite to that of the document) (S10: YES) when the first judgment on the scan direction (sub scanning direction S) is "opposite" and the acquired document binding information represents a long edge document and when the first judgment on the scan direction (sub scanning direction S) is "not opposite" and the acquired document binding information represents a short edge document.

When the vertical inversion is necessary (S10: YES), the PC 20 vertically inverts the image data of the back side (S11), by which the recognizable direction of the image data of the back side is adjusted to that of the image data of the front side (standard recognizable direction: upward).

After finishing the above inversion process, the PC 20 receiving "next page presence/absence information" (indicating whether there exists the next page or not) from the document scanning device 10 (S12/T12, T19→) transmits a next page request (requesting the scanning of the next page) to the document scanning device 10 (S14/→T13, T20) when the next page presence/absence information indicates that there exists the next page (S13: YES). On the other hand, when the next page presence/absence information indicates that there exists no next page (S13: NO), the PC 20 stores the scanned image data (or the inverted image data when the inversion is executed) or hands over the image data to an upper-level application (S15), and ends the process of FIG. 10.

(2-2) Process Executed by Document Scanning Device

Referring to FIG. 11, when the scan request command is received from the PC 20 (T1: YES/S5→), the document scanning device 10 judges whether or not the a double-side scan instruction is included in the scan request command (T2). The double-side scan instruction is included in the scan request command when the check box 33 of the double-side scan setting area 31 has been selected on the user interface screen 3 (see FIG. 9) displayed on the display unit 22 of the PC 20.

If the double-side scan instruction is not included in the scan request command, that is, if single-side scanning is requested (T2: single-side), the document scanning device 10 takes in a document from the document supply tray 16 (T3), transmits the scan direction information to the PC 20 (T4/→S6), scans one side of the document (T5), transmits image data generated by the scanning to the PC 20 (T6/→S7), and ejects the document to the document output tray 19 (T7). The scan direction information of the step T4 includes information representing the ordinary scanning, that is, information indicating that the image data is not inverted in the horizontal direction nor in the vertical direction.

On the other hand, if the double-side scan instruction is included in the scan request command (T2: double-side), the document scanning device 10 takes in a document from the document supply tray 16 (T8), transmits the scan direction information to the PC 20 (T9/→S6), scans the first surface (front side) of the document (T10), and transmits image data of the first surface generated by the scanning to the PC 20 (T11/→S7). The scan direction information of the step T9 includes information representing the ordinary scanning, that is, information indicating that the image data is in the normal state (not inverted in the horizontal direction nor in the vertical direction).

After transmitting the scanned image data of the first surface (T11), the document scanning device 10 transmits next page presence information (indicating that there exists the next page) to the PC 20 (T12/→S12). The next page presence information is information provisionally transmitted to the PC 20 in order to let the PC 20 prepare for reception of new image data (see FIG. 10: S13→S14→S6).

Thereafter, when the next page request is received from the PC 20 (T13: YES), the document scanning device 10 turns over the document as explained above (T14), transmits the scan direction information to the PC 20 (T15/→S6), scans the second surface (back side) of the document (T16), and transmits image data of the second surface generated by the scanning to the PC 20 (T17/→S7). The scan direction information of the step T15 includes information about the scan direction of the second surface (back side), that is, information regarding whether or not the image data is inverted in the horizontal direction and/or in the vertical direction. After transmitting the scanned image data of the second surface (T17), the document scanning device 10 ejects the document to the document output tray 19 (T18).

After ejecting the document to the document output tray 19 (T7, T18), the document scanning device 10 transmits the next page presence/absence information to the PC 20 (T19/→S12). Specifically, when the next document existing in the document supply tray 16 is detected by an unshown document sensor, the document scanning device 10 transmits the next page presence information to the PC 20, otherwise the document scanning device 10 transmits next page absence information to the PC 20.

Thereafter, the document scanning device 10 judges whether or not the next page request is received from the PC 20 (T20/S14→). If the next page request is received (T20: YES), the process returns to the step S2 to restart the scanning. If the next page request is not received (T20: NO), the process of FIG. 11 is ended.

As described above, the document scanning system 100 of the above embodiment is effective especially when the system includes a plurality of document scanning devices (10, etc.) of different double-side scanning methods that can be operated by the PC 20 in which the (general-purpose) scanner driver program 2P has been installed. In other words, even when a plurality of document scanning devices carry out the double-side scanning according to different double-side scanning methods, each document scanning device transmits the scan direction information (information regarding the double-side scanning method) to the PC 20 when the document scanning device scans the second surface (back side) of a double-sided document and transmits the scanned image data, by which the PC 20 is allowed to execute the inversion process to the scanned image data of the second surface properly irrespective of the double-side scanning method employed by the document scanning device.

(3) Modifications

In the following, several modifications of the document scanning system 100 of the above embodiment will be described. In the following description, only elements different from those of the above embodiment will be explained, wherein the same reference characters will be used for elements already described in the above embodiment and repeated description thereof is omitted for brevity.

(3-1) First Modification

Figure 12:
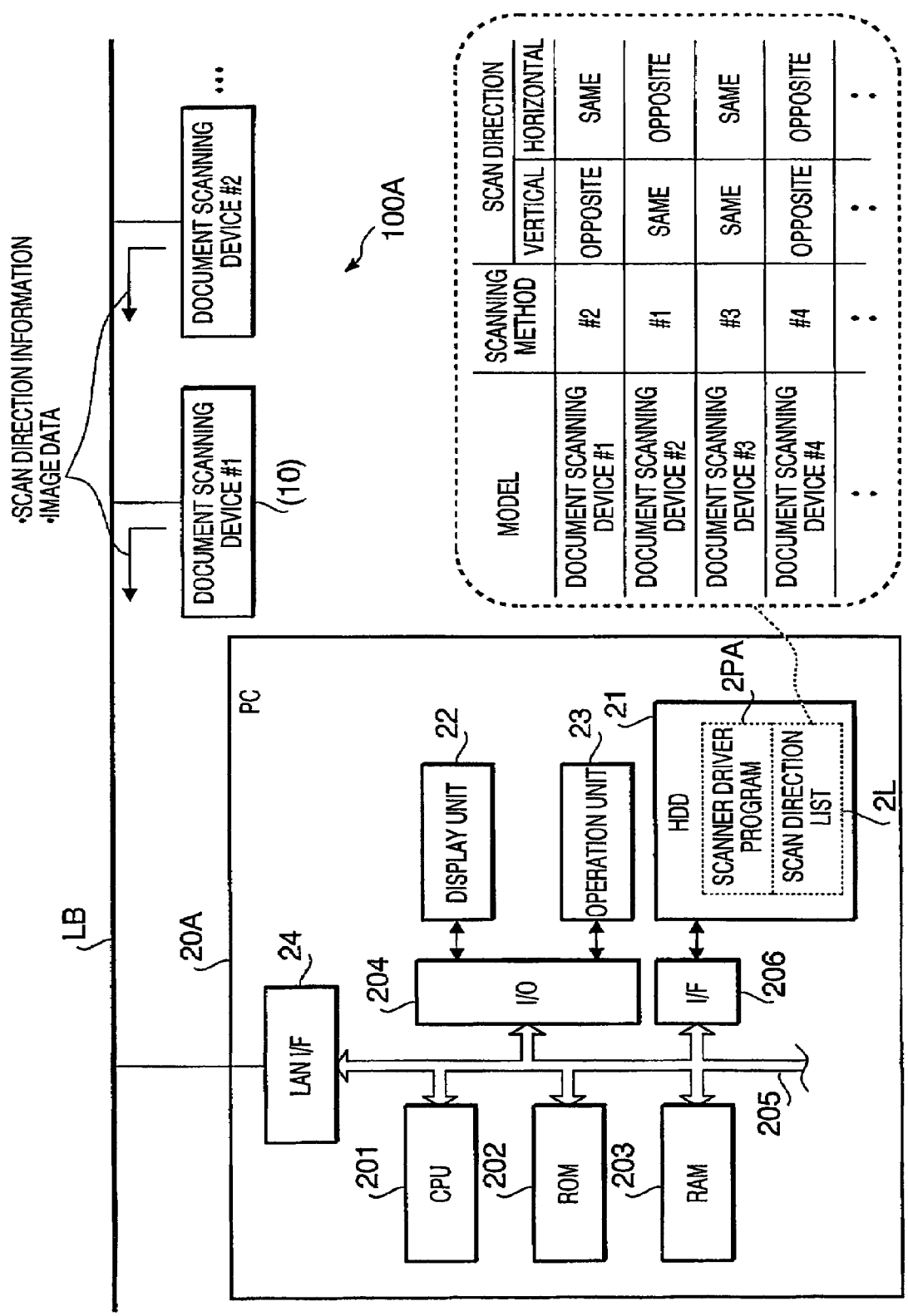
FIG. 12 is a block diagram showing the composition of a document scanning system as a first modification of the embodiment.

FIG. 12 is a block diagram showing the composition of a document scanning system 100A as a first modification of the embodiment. In the document scanning system 100A, each document scanning device (10A, etc.) is configured to output "scanning method information", representing the scanning method of the document scanning device, to a PC 20A. The scanning method information takes on different values depending on the scanning method of each document scanning device. Therefore, document scanning devices outputting the same value (scanning method information) as the document scanning device 10A are employing the same scanning method as the document scanning device 10A, while document scanning devices outputting values different from that of the document scanning device 10A are employing scanning methods different from that of the document scanning device 10A. Meanwhile, the PC 20A has stored a "scan direction list 2L" in the HDD 21. In the scan direction list 2L, multiple pieces of scan direction information are listed while being associated with corresponding scanning method information, in regard to multiple types of document scanning devices. The PC 20A executes the inversion process to the image data of the second surface (back side) based on the scanning method information received from the document scanning device (10A, etc.).

Concrete processes executed by the PC 20A and the document scanning device 10A will be explained referring again to the flow charts of FIGS. 10 and 11.

Between the pressing of the scan start button 37 on the user interface screen 3 by the user (S2: YES) and the transmission of the scan request command to the document scanning device 10A (S5) in the flow chart of FIG. 10, the PC 20A (under the control of a scanner driver program 2PA) executes steps of requesting the document scanning device 10A to output the scanning method information, acquiring the scanning method information from the document scanning device 10A, and searching the scan direction list 2L for scan direction information corresponding to the acquired scanning method information.

In the scan direction list 2L, multiple pieces of scan direction information are listed while being associated with corresponding scanning method information in regard to multiple types of document scanning devices as mentioned above. The scan direction information is information indicating whether the scan direction in the back side scan is the same as or opposite to that in the front side scan in regard to the vertical direction (sub scanning direction S) and the horizontal direction (main scanning direction M) as shown on the right-hand side of FIGS. 5A-5D, that is, information regarding whether the recognizable direction and the reading direction of the image data of the back side of the document are the same as or opposite to those of the document. Each piece of scan direction information is stored in the scan direction list 2L while being associated with corresponding scanning method information (representing the scanning method #1, #2, #3 or #4, for example).

The PC 20A executes the inversion process to the image data based on the scan direction information (corresponding to the acquired scanning method information) found in the scan direction list 2L and the scanning parameters which have been set on the user interface screen 3 (specifically, the document binding information) (S8-S11).

In the step S8, the PC 20A first judges whether the scan direction in the back side scan is the same as or opposite to that in the front side scan in regard to the horizontal direction (main scanning direction M) based on the scan direction information (corresponding to the scanning method information acquired from the document scanning device 10A) found in the scan direction list 2L. The PC 20A also judges whether the scanned document is a short edge document (in which the reading direction on the back side is the same as that on the front side) or a long edge document (in which the reading direction on the back side is opposite to that on the front side) based on the acquired document binding information. Based on the above judgments, the PC 20A judges whether the horizontal inversion of the image-data is necessary or not.

When the horizontal inversion is necessary (S8: YES), the PC 20A horizontally inverts the image data of the back side (S9), by which the reading direction of the image data of the back side is adjusted to that of the image data of the front side (standard reading direction: rightward).

In the step S10, the PC 20A first judges whether the scan direction in the back side scan is the same as or opposite to that in the front side scan in regard to the vertical direction (sub scanning direction S) based on the scan direction information (corresponding to the scanning method information acquired from the document scanning device 10A) found in the scan direction list 2L. The PC 20A also judges whether the scanned document is a short edge document (in which the reading direction on the back side is the same as that on the front side) or a long edge document (in which the reading direction on the back side is opposite to that on the front side) based on the acquired document binding information. Based on the above judgments, the PC 20A judges whether the vertical inversion of the image data is necessary or not.

When the vertical inversion is necessary (S10: YES), the PC 20A vertically inverts the image data of the back side (S11), by which the recognizable direction of the image data of the back side is adjusted to that of the image data of the front side (standard recognizable direction: upward).

Incidentally, in this first modification, the step S6 (of acquiring the scan direction information from the document scanning device) does not exist in the process of FIG. 10 since the PC 20A acquires the scan direction information from the scan direction list 2L.

Meanwhile, in the process of FIG. 11, the document scanning device 10A executes a step of outputting the scanning method information to the PC 20A in response to the aforementioned request from the PC 20A before executing the step T1 (of judging whether the scan request command has been received or not). Therefore, the steps T4, T9 and T15 (of transmitting the scan direction information to the PC) do not exist in the process of FIG. 11 in the first modification.

(3-2) Second Modification

Figure 13:
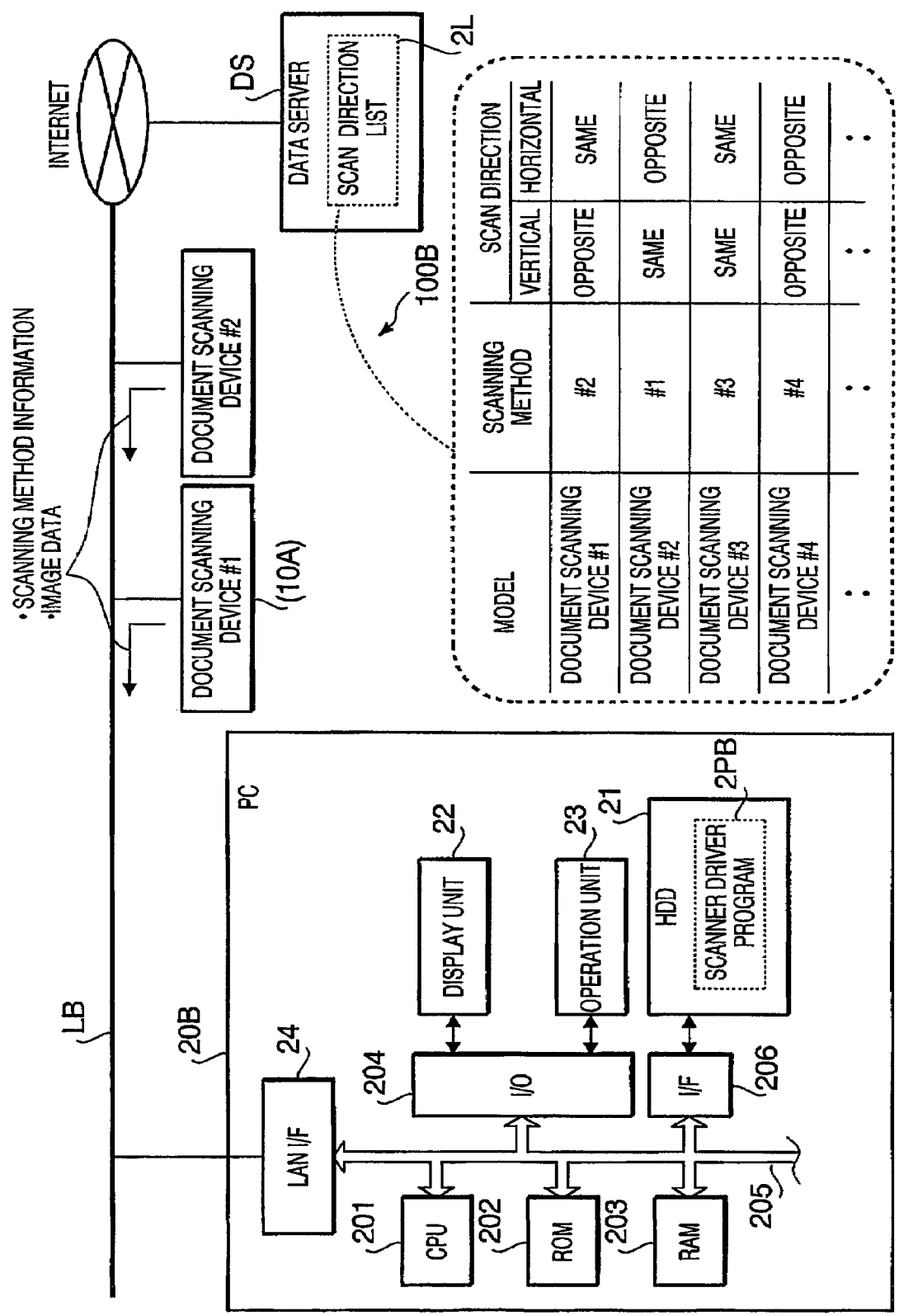
FIG. 13 is a block diagram showing the composition of a document scanning system as a second modification of the embodiment.

FIG. 13 is a block diagram showing the composition of a document scanning system 100B as a second modification of the embodiment. In the second modification, each document scanning device (10A, etc.) is configured to transmit the scanning method information to a PC 20B similarly to the first modification. The difference from the first modification is that the scan direction list 2L (in which multiple pieces of scan direction information are listed while being associated with corresponding scanning method information (representing a scanning method) in regard to multiple types of document scanning devices) is stored not in the PC but in a data server DS on the Internet. The PC 20B inquires of the data server DS which scan direction information corresponds to the scanning method information acquired from the document scanning device (10A, etc.), acquires a response from the data server DS, and executes the inversion process to the image data of the second surface (back side) of the document based on the scan direction information included in the response.

The process executed by the PC 20B in the second modification is substantially the same as the process executed by the PC 20A in the first modification except for the aforementioned step of inquiring of the data server DS about the corresponding scan direction information. Specifically, between the pressing of the scan start button 37 on the user interface screen 3 by the user (S2: YES) and the transmission of the scan request command to the document scanning device 10A (S5) in the flow chart of FIG. 10, the PC 20B (under the control of a scanner driver program 2PB) executes steps of requesting the document scanning device 10A to output the scanning method information and acquiring the scanning method information from the document scanning device 10A. Subsequently, the PC 20B executes the aforementioned step of inquiring of the data server DS about the scan direction information corresponding to the acquired scanning method information. The PC 20B executes the inversion process to the image data based on the scan direction information acquired from the data server DS and the scanning parameters which have been set on the user interface screen 3 (specifically, the document binding information) (S8-S11).

(3-3) Third Modification

Figure 14:
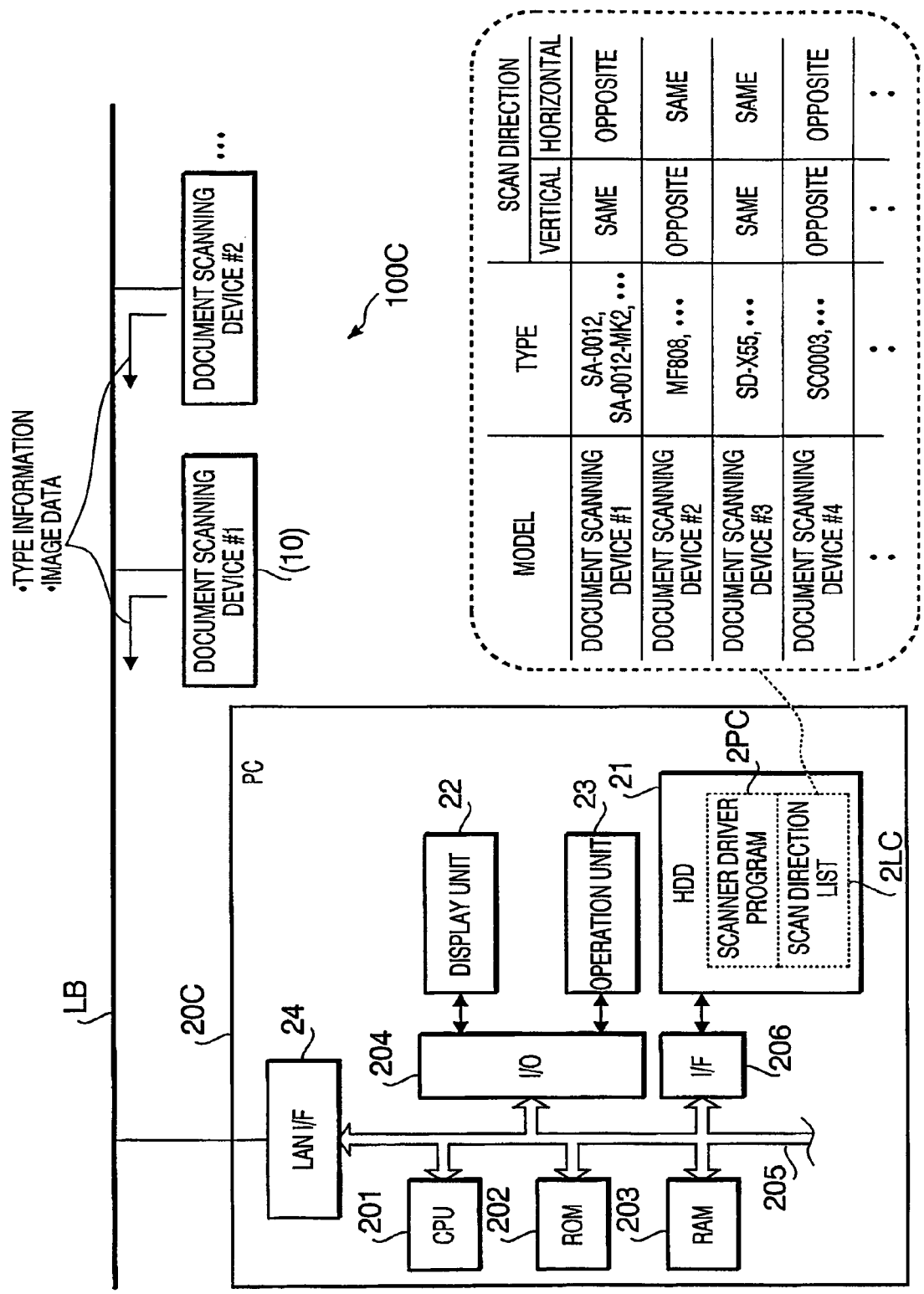
FIG. 14 is a block diagram showing the composition of a document scanning system as a third modification of the embodiment.
Figure 15:
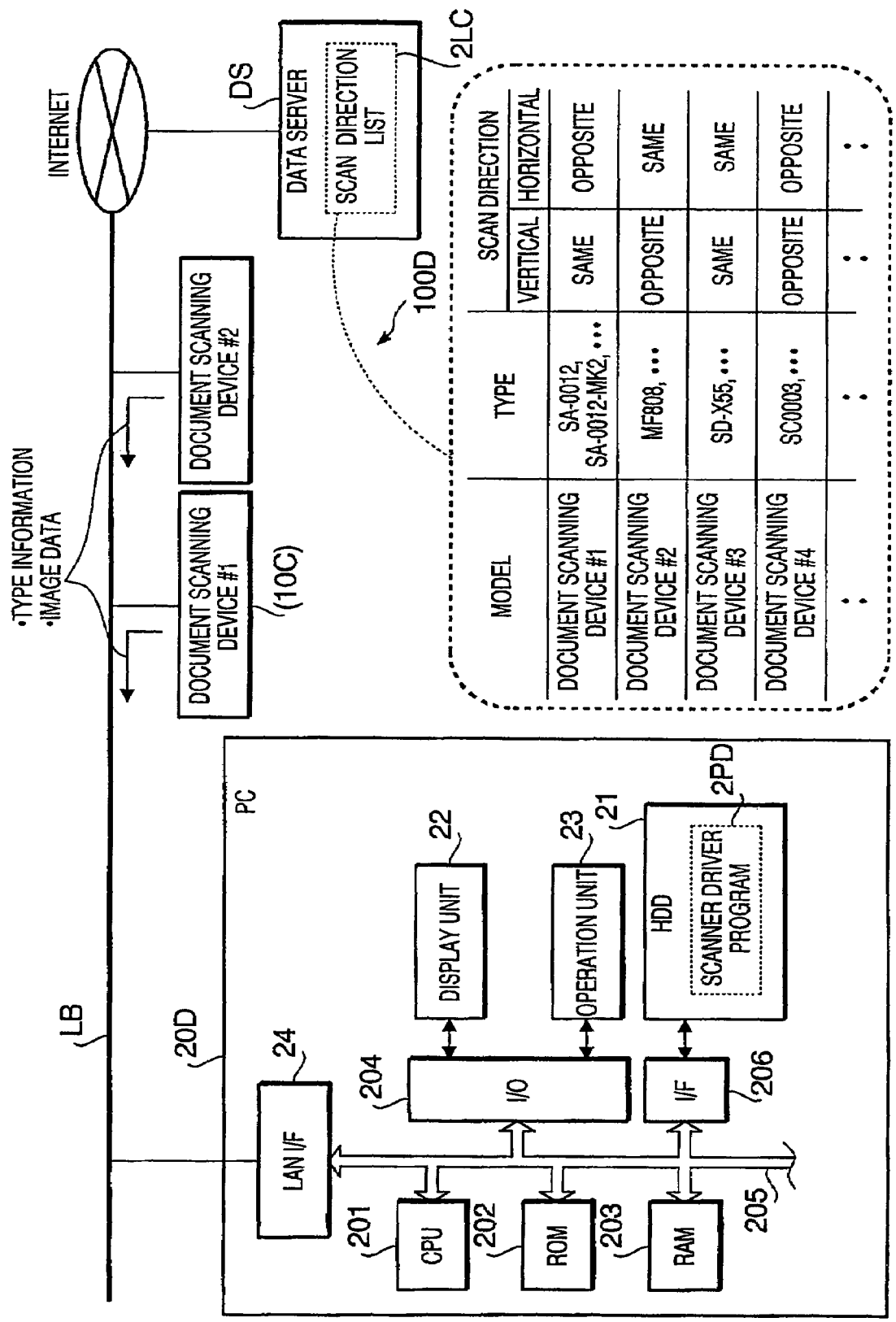
FIG. 15 is a block diagram showing the composition of a document scanning system as a fourth modification of the embodiment.

FIG. 14 is a block diagram showing the composition of a document scanning system 100C as a third modification of the embodiment. In the third modification, each document scanning device (10C, etc.) is configured to output "type information", representing the type of the document scanning device, to the PC 20C. The type information takes on different values depending on the type or model series of the document scanning device. Therefore, document scanning devices outputting the same value (type information) as the document scanning device 10C are of the same type or model series as the document scanning device 10C, while document scanning devices outputting values different from that of the document scanning device 10C are of types or model series different from the document scanning device 10C. Meanwhile, the PC 20C has stored a "scan direction list 2LC" in the HDD 21. In the scan direction list 2LC, multiple pieces of scan direction information are listed while being associated with corresponding type information, in regard to multiple types of document scanning devices. The PC 20C executes the inversion process to the image data of the second surface (back side) based on the type information received from the document scanning device (10C, etc.).

Concrete processes executed by the PC 20C and the document scanning device 10C will be explained referring again to the flow charts of FIG. 10 and 11.

Between the pressing of the scan start button 37 on the user interface screen 3 by the user (S2: YES) and the transmission of the scan request command to the document scanning device 10C (S5) in the flow chart of FIG. 10, the PC 20C (under the control of a scanner driver program 2PC) executes steps of requesting the document scanning device 10C to output the type information, acquiring the type information from the document scanning device 10C, and searching the scan direction list 2LC for scan direction information corresponding to the acquired type information.

In the scan direction list 2LC, multiple pieces of scan direction information are listed while being associated with corresponding type information in regard to multiple types of document scanning devices as mentioned above. The scan direction information is information indicating whether the scan direction in the back side scan is the same as or opposite to that in the front side scan in regard to the vertical direction (sub scanning direction S) and the horizontal direction (main scanning direction M) as shown on the right-hand side of FIGS. 5A-5D, that is, information regarding whether the recognizable direction and the reading direction of the image data of the back side of the document are the same as or opposite to those of the document. Each piece of scan direction information is stored in the scan direction list 2LC while being associated with corresponding type information.

The PC 20C executes the inversion process to the image data based on the scan direction information (corresponding to the acquired type information) found in the scan direction list 2LC and the scanning parameters which have been set on the user interface screen 3 (specifically, the document binding information) (S8-S11).

In the step S8, the PC 20C first judges whether the scan direction in the back side scan is the same as or opposite to that in the front side scan in regard to the horizontal direction (main scanning direction M) based on the scan direction information (corresponding to the type information acquired from the document scanning device 10C) found in the scan direction list 2LC. The PC 20C also judges whether the scanned document is a short edge document (in which the reading direction on the back side is the same as that on the front side) or a long edge document (in which the reading direction on the back side is opposite to that on the front side) based on the acquired document binding information. Based on the above judgments, the PC 20C judges whether the horizontal inversion of the image data is necessary or not.

When the horizontal inversion is necessary (S8: YES), the PC 20C horizontally inverts the image data of the back side (S9), by which the reading direction of the image data of the back side is adjusted to that of the image data of the front side (standard reading direction: rightward).

In the step S10, the PC 20C first judges whether the scan direction in the back side scan is the same as or opposite to that in the front side scan in regard to the vertical direction (sub scanning direction S) based on the scan direction information (corresponding to the type information acquired from the document scanning device 10C) found in the scan direction list 2LC. The PC 20C also judges whether the scanned document is a short edge document (in which the reading direction on the back side is the same as that on the front side) or a long edge document (in which the reading direction on the back side is opposite to that on the front side) based on the acquired document binding information. Based on the above judgments, the PC 20C judges whether the vertical inversion of the image data is necessary or not.

When the vertical inversion is necessary (S10: YES), the PC 20C vertically inverts the image data of the back side (S11), by which the recognizable direction of the image data of the back side is adjusted to that of the image data of the front side (standard recognizable direction: upward).

Incidentally, in this third modification, the step S6 (of acquiring the scan direction information from the document scanning device) does not exist in the process of FIG. 10 since the PC 20C acquires the scan direction information from the scan direction list 2LC.

Meanwhile, in the process of FIG. 11, the document scanning device 10C executes a step of outputting the type information to the PC 20C in response to the aforementioned request from the PC 20C before executing the step T1 (of judging whether the scan request command has been received or not). Therefore, the steps T4, T9 and T15 (of transmitting the scan direction information to the PC) do not exist in the process of FIG. 11 in the third modification.

(3-4) Fourth Modification

FIG. 14 is a block diagram showing the composition of a document scanning system 100D as a fourth modification of the embodiment. In the fourth modification, each document scanning device (10C, etc.) is configured to transmit the type information to the PC 20D similarly to the third modification. The difference from the third modification is that the scan direction list 2LC (in which multiple pieces of scan direction information are listed while being associated with corresponding type information in regard to multiple types of document scanning devices) is stored not in the PC but in a data server DS on the Internet. The PC 20D inquires of the data server DS which scan direction information corresponds to the type information acquired from the document scanning device (10C, etc.), acquires a response from the data server DS, and executes the inversion process to the image data of the second surface (back side) of the document based on the scan direction information included in the response.

The process executed by the PC 20D in the fourth modification is substantially the same as the process executed by the PC 20C in the third modification except for the aforementioned step of inquiring of the data server DS about the corresponding scan direction information. Specifically, between the pressing of the scan start button 37 on the user interface screen 3 by the user (S2: YES) and the transmission of the scan request command to the document scanning device 10C (5) in the flow chart of FIG. 10, the PC 20D (under the control of a scanner driver program 2PD) executes steps of requesting the document scanning device 10C to output the type information and acquiring the type information from the document scanning device 10C. Subsequently, the PC 20D executes the aforementioned step of inquiring of the data server DS about the scan direction information corresponding to the acquired type information. The PC 20D executes the inversion process to the image data based on the scan direction information acquired from the data server DS and the scanning parameters which have been set on the user interface screen 3 (specifically, the document binding information) (S8-S11).

Incidentally, while the PC 20 (20A-20D) in the document scanning system 100 (100A-100D) described above-lets-the user specify whether the document to be scanned is a long edge document or a short edge document (document binding information) through the radio buttons 35 of the user interface screen 3 (see FIG. 9) displayed on the display unit 22 and executes the inversion process based on the document binding information, it is also possible, for example, to configure the document scanning device 10 (10A, 10C) to let the user specify the document binding information through the operation keys 131 on the unshown operation panel. In this case, the document scanning device 10 (10A, 10C) transmits the document binding information and the scan direction information (, the scanning method information or the type information) to the PC 20 (20A-20D) in addition to the scanned image data.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims. For example, while an MFP (having the scanner function, the printer function, the facsimile function, etc. in one body) has been taken as an example of a document scanning device in the above embodiment, a scanner (having the scanner function only), an MFP having the scanner function and the printer function only, etc. may of course be employed as a document scanning device in the document scanning system in accordance with the present invention. While a document scanning system supporting both long edge documents and short edge documents has been described in the above embodiment, the present invention is also applicable to document scanning systems supporting long edge documents (which are mainly used in general) only. In such document scanning systems, the inversion process may be executed on the assumption that the scanned document is a long edge document, without using the document binding information, that is, using a fixed factor "horizontal inversion" as the factor regarding the document binding information in the multiplication shown in FIG. 8.

What is claimed is:

1. An information processing device comprising:
    a communication unit which communicates with, via a network, a first document scanning device having a first type of scanning and a second document scanning device having a second type of scanning, image data generated by the first and the second document scanning devices having different recognizable directions corresponding to the first and the second type of scanning;
    an image data receiving unit which receives, via the communication unit, image data of each page of a double-sided document generated by one of the first document scanning device and the second document scanning device;
    a document binding information input unit which receives document binding information input by a user as information for specifying whether the double-sided document is a long edge document or a short edge document;
    a recognizable direction adjustment information generating unit which generates recognizable direction adjustment information, based on both of (A) whether the received image data is generated by the first document scanning device having the first type of scanning or the second document scanning device having the second type of scanning, and (B) whether the inputted document binding information specifies the long edge document or the short edge document; and
    a vertical inversion unit which vertically inverts the image data corresponding to a back page based on the recognizable direction adjustment information generated by the recognizable direction adjustment information generating unit.

2. The information processing device according to claim 1, wherein:
    the recognizable direction adjustment information generating unit generates recognizable direction information, which takes on different values depending on whether the recognizable direction of the image data of each page is the same as or opposite to the recognizable direction of the document, as the recognizable direction adjustment information;
    the information processing device further comprises a recognizable direction judgment unit which judges whether or not the recognizable direction of the image data of each page is opposite to the recognizable direction of the document based on the recognizable direction information; and
    the vertical inversion unit vertically inverts the image data corresponding to the back page when the recognizable direction of the image data corresponding to the back page is judged to be opposite to the recognizable direction of the document by the first recognizable direction judgment unit.

3. The information processing device according to claim 1, further comprising a scanning method information receiving unit which receives scanning method information, which represents a double-side scanning method of one of the first document scanning device and the second document scanning device and takes on different values depending on the scanning method, wherein:
    the recognizable direction adjustment information generating unit generates the recognizable direction adjustment information, based on both of (A) the scanning method information, and (B) whether the inputted document binding information specifies the long edge document or the short edge document; and
    the information processing device further comprises a recognizable direction judgment unit which judges whether or not the recognizable direction of the image data of each page is opposite to the recognizable direction of the document based on the recognizable direction adjustment information; and
    the vertical inversion unit vertically inverts the image data corresponding to the back page when the recognizable direction of the image data corresponding to the back page is judged to be opposite to the recognizable direction of the document by the recognizable direction judgment unit.

4. The information processing device according to claim 3, further comprising a first storage unit which stores information indicating whether or not the recognizable direction of the image data of the back page is opposite to the recognizable direction of the document while associating the information with possible pieces of scanning method information, wherein the recognizable direction judgment unit judges that the recognizable direction of the image data of the back page is opposite to the recognizable direction of the document when the information stored in the first storage unit being associated with the scanning method information received from one of the first document scanning device and the second document scanning device indicates the fact.

5. The information processing device according to claim 1, further comprising a type information receiving unit which receives type information, which represents the type of one of the first document scanning device and the second document scanning device and takes on different values depending on the type, wherein:

the recognizable direction adjustment information generating unit generates the recognizable direction adjustment information, based on both of (A) the type information, and (B) whether the inputted document binding information specifies the long edge document or the short edge document;

the information processing device further comprises a recognizable direction judgment unit which judges whether or not the recognizable direction of the image data of each page is opposite to the recognizable direction of the document based on the recognizable direction adjustment information; and the vertical inversion unit vertically inverts the image data corresponding to the back page when the recognizable direction of the image data corresponding to the back page is judged to be opposite to the recognizable direction of the document by the recognizable direction judgment unit.

6. The information processing device according to claim 5, further comprising a second storage unit which stores information indicating whether or not the recognizable direction of the image data of the back page is opposite to the recognizable direction of the document while associating the information with possible pieces of type information, wherein the recognizable direction judgment unit judges that the recognizable direction of the image data of the back page is opposite to the recognizable direction of the document when the information stored in the second storage unit being associated with the type information received from one of the first document scanning device and the second document scanning device indicates the fact.

7. The information processing device according to claim 1, further comprising:

a reading direction adjustment information generating unit which generates reading direction adjustment information, based on both of (A) whether the received image data is generated by the first document scanning device having the first type of scanning or the second document scanning device having the second type of scanning, and (B) whether the inputted document binding information specifies the long edge document or the short edge document; and a horizontal inversion unit which horizontally inverts the image data corresponding to the back page based on the reading direction adjustment information generated by the reading direction adjustment information generating unit.

8. The information processing device according to claim 7, further comprising a scanning method information receiving unit which receives scanning method information, which represents a double-side scanning method of one of the first document scanning device and the second document scanning device and takes on different values depending on the scanning method, wherein:

the reading direction adjustment information generating unit generates the reading direction adjustment information, based on both of (A) the scanning method information, and (B) whether the inputted document binding information specifies the long edge document or the short edge document;

the information processing device further comprises a reading direction judgment unit which judges whether or not the reading direction of the image data of each page is opposite to the reading direction of the document based on the recognizable direction adjustment information; and the horizontal inversion unit horizontally inverts the image data corresponding to the back page when the reading direction of the image data corresponding to the back page is judged to be opposite to the reading direction of the document by the reading direction judgment unit.

9. The information processing device according to claim 8, further comprising a third storage unit which stores information indicating whether or not the reading direction of the image data of the back page is opposite to the reading direction of the document while associating the information with possible pieces of scanning method information, wherein the reading direction judgment unit judges that the reading direction of the image data of the back page is opposite to the reading direction of the document when the information stored in the third storage unit being associated with the scanning method information received from one of the first document scanning device and the second document scanning device indicates the fact.

10. The information processing device according to claim 7, further comprising a type information receiving unit which receives type information, which represents the type of one of the first document scanning device and the second document scanning device and takes on different values depending on the type, wherein:

the reading direction adjustment information generating unit generates the reading direction adjustment information, based on both of (A) the type information, and (B) whether the inputted document binding information specifies the long edge document or the short edge document;

the information processing device further comprises a reading direction judgment unit which judges whether or not the reading direction of the image data of each page is opposite to the reading direction of the document based on the recognizable direction adjustment information, and the horizontal inversion unit horizontally inverts the image data corresponding to the back page when the reading direction of the image data corresponding to the back page is judged to be opposite to the reading direction of the document by the reading direction judgment unit.

11. The information processing device according to claim 10, further comprising a fourth storage unit which stores information indicating whether or not the reading direction of the image data of the back page is opposite to the reading direction of the document while associating the information with possible pieces of type information, wherein the reading direction judgment unit judges that the reading direction of the image data of the back page is opposite to the reading direction of the document when the information stored in the fourth storage unit being associated with the type information received from one of the first document scanning device and the second document scanning device indicates the fact.

12. A computer readable medium having computer readable instructions stored thereon, which, when executed by a computer, cause the computer to function as:

a communication unit which communicates with, via a network, a first document scanning device having a first type of scanning and a second document scanning device having a second type of scanning, image data generated by the first and the second document scanning devices having different recognizable directions corresponding to the first and the second type of scanning;

an image data receiving unit which receives, via the communication unit, image data of each page of a double-sided document generated by one of the first document scanning device and the second document scanning device;

a document binding information input unit which receives document binding information input by a user as information for specifying whether the double-sided document is a long edge document or a short edge document; and a recognizable direction adjustment information generating unit which generates recognizable direction adjustment information, based on both of (A) whether the received image data is generated by the first document scanning device having the first type of scanning or the second document scanning device having the second type of scanning, and (B) whether the inputted document binding information specifies the long edge document or the short edge document; and a vertical inversion unit which vertically inverts the image data corresponding to a back page based on the recognizable direction adjustment information generated by the recognizable direction adjustment information generating unit.

13. A document scanning system comprising
a first document scanning device;
a second document scanning device; and
an information processing device, wherein:
the first document scanning device having a first type of scanning and the second document scanning device having a second type of scanning, image data generated by the first and the second document scanning devices having different recognizable directions corresponding to the first and the second type of scanning;
each of the first document scanning device and the second document scanning device comprises:
a scanning unit which scans each page of a double-sided document and thereby generates image data of each page; and an image data outputting unit which outputs the image data of each page generated by the scanning unit; and
the information processing device comprises:
a communication unit which communicates with, via a network, the first document scanning device and the second document scanning device;
an image data receiving unit which receives, via the communication unit, the image data of each page of the document generated by one of the first document scanning device and the second document scanning device;
a document binding information input unit which receives document binding information input by a user as information for specifying whether the double-sided document is a long edge document or a short edge document;
a recognizable direction adjustment information generating unit which generates recognizable direction adjustment information, based on both of (A) whether the received image data is generated by the first document scanning device having the first type of scanning or the second document scanning device having the second type of scanning, and (B) whether the inputted document binding information specifies the long edge document or the short edge document; and
a vertical inversion unit which vertically inverts the image data corresponding to a back page based on the recognizable direction adjustment information generated by the recognizable direction adjustment information generating unit.

14. The document scanning system according to claim 13, wherein:
the recognizable direction adjustment information generating unit of the information processing device generates the recognizable direction information as the recognizable direction adjustment information;
the information processing device further comprises a recognizable direction judgment unit which judges whether or not the recognizable direction of the image data of each page is opposite to the recognizable direction of the document based on the recognizable direction information, and
the vertical inversion unit of the information processing device vertically inverts the image data corresponding to the back page when the recognizable direction of the image data corresponding to the back page is judged to be opposite to the recognizable direction of the document by the recognizable direction judgment unit.

15. The document scanning system according to claim 13, wherein:
each of the first document scanning device and the second document scanning device having a scanning method information outputting unit which outputs scanning method information, which represents a double-side scanning method of one of the first document scanning device and the second document scanning device and takes on different values depending on the scanning method;
the information processing device further comprises a scanning method information receiving unit which receives scanning method information;
the recognizable direction adjustment information generating unit of the information processing device generates the recognizable direction adjustment information, based on both of (A) the scanning method information, and (B) whether the inputted document binding information specifies the long edge document or the short edge document;

the information processing device further comprises a recognizable direction judgment unit which judges whether or not the recognizable direction of the image data of each page is opposite to the recognizable direction of the document based on the recognizable direction adjustment information, and the vertical inversion unit of the information processing device vertically inverts the image data corresponding to the back page when the recognizable direction of the image data corresponding to the back page is judged to be opposite to the recognizable direction of the document by the recognizable direction judgment unit.

16. The document scanning system according to claim 15, wherein:

the information processing device further comprises a first storage unit which stores information indicating whether or not the recognizable direction of the image data of the back page is opposite to the recognizable direction of the document while associating the information with possible pieces of scanning method information, and the recognizable direction judgment unit of the information processing device judges that the recognizable direction of the image data of the back page is opposite to the recognizable direction of the document when the information stored in the first storage unit being associated with the scanning method information received from one of the first document scanning device and the second document scanning device indicates the fact.

17. The document scanning system according to claim 13, wherein:

each of the first document scanning device and the second document scanning device having a type information outputting unit which outputs type information, which represents the type of one of the first document scanning device and the second document scanning device and takes on different values depending on the type;

the information processing device further comprising a type information receiving unit which receives type information;

the recognizable direction adjustment information generating unit of the information processing device generates the recognizable direction adjustment information, based on both of (A) the type information, and (B) whether the inputted document binding information specifies the long edge document or the short edge document;

the information processing device further comprises a recognizable direction judgment unit which judges whether or not the recognizable direction of the image data of each page is opposite to the recognizable direction of the document based on the recognizable direction adjustment information, and the vertical inversion unit of the information processing device vertically inverts the image data corresponding to the back page when the recognizable direction of the image data corresponding to the back page is judged to be opposite to the recognizable direction of the document by the third recognizable direction judgment unit.

18. The document scanning system according to claim 17, wherein:

the information processing device further comprises a second storage unit which stores information indicating whether or not the recognizable direction of the image data of the back page is opposite to the recognizable direction of the document while associating the information with possible pieces of type information, and the recognizable direction judgment unit of the information processing device judges that the recognizable direction of the image data of the back page is opposite to the recognizable direction of the document when the information stored in the second storage unit being associated with the type information received from one of the first document scanning device and the second document scanning device indicates the fact.

19. The document scanning system according to claim 13, wherein:

the information processing device further comprises:
a reading direction adjustment information generating unit which generates reading direction adjustment information, based on both of (A) whether the received image data is generated by the first document scanning device having the first type of scanning or the second document scanning device having the second type of scanning, and (B) whether the inputted document binding information specifies the long edge document or the short edge document; and a horizontal inversion unit which horizontally inverts the image data corresponding to the back page based on the reading direction adjustment information generated by the reading direction adjustment information generating unit.

20. The document scanning system according to claim 19, wherein:

each of the first document scanning device and the second document scanning device having a scanning method information outputting unit which outputs scanning method information, which represents a double-side scanning method of one of the first document scanning device and the second document scanning device and takes on different values depending on the scanning method;

the information processing device further comprises a scanning method information receiving unit which receives scanning method information;

the reading direction adjustment information generating unit of the information processing device generates the reading direction adjustment information, based on both of (A) the scanning method information, and (B) whether the inputted document binding information specifies the long edge document or the short edge document;

the information processing device further comprises a reading direction judgment unit which judges whether or not the reading direction of the image data of each page is opposite to the reading direction of the document based on the recognizable direction adjustment information;

the horizontal inversion unit of the information processing device horizontally inverts the image data corresponding to the back page when the reading direction of the image data corresponding to the back page is judged to be opposite to the reading direction of the document by the reading direction judgment unit.

21. The document scanning system according to claim 20, wherein:

the information processing device further comprises a third storage unit which stores information indicating whether or not the reading direction of the image data of the back page is opposite to the reading direction of the document while associating the information with possible pieces of scanning method information, and the reading direction judgment unit of the information processing device judges that the reading direction of the image data of the back page is opposite to the reading direction of the document when the information stored in the third storage unit being associated with the scanning method information received from one of the first document scanning device and the second document scanning device indicates the fact.

22. The document scanning system according to claim 19, wherein:

each of the first document scanning device and the second document scanning device having a type information outputting unit which outputs type information, which represents the type of one of the first document scanning device and the second document scanning device and takes on different values depending on the type;

the information processing device further comprising a type information receiving unit which receives type information;

the reading direction adjustment information generating unit of the information processing device generates the reading direction adjustment information, based on both of (A) the type information, and (B) whether the inputted document binding information specifies the long edge document or the short edge document;

the information processing device further comprises a reading direction judgment unit which judges whether or not the reading direction of the image data of each page is opposite to the reading direction of the document based on the recognizable direction adjustment information; and the horizontal inversion unit of the information processing device horizontally inverts the image data corresponding to the back page when the reading direction of the image data of corresponding to the back page is judged to be opposite to the reading direction of the document by the reading direction judgment unit.

23. The document scanning system according to claim 22, wherein:

the information processing device further comprises a fourth storage unit which stores information indicating whether or not the reading direction of the image data of the back page is opposite to the reading direction of the document while associating the information with possible pieces of type information, and the reading direction judgment unit of the information processing device judges that the reading direction of the image data of the back page is opposite to the reading direction of the document when the information stored in the fourth storage unit being associated with the type information received from one of the first document scanning device and the second document scanning device indicates the fact.

\* \* \* \* \*